United States Patent Office 3,272,811
Patented Sept. 13, 1966

3,272,811
DIHYDROTHIENO-[3,4-d]-PYRIMIDINES
Gerhard Ohnacker and Eberhard Woitun, Biberach an der Riss, Germany, assignors, by mesne assignments, to Boehringer Ingelheim G.m.b.H., Ingelheim (Rhine), Germany, a corporation of Germany
No Drawing. Filed June 17, 1963, Ser. No. 288,491
Claims priority, application Germany, July 4, 1962, T 22,407
14 Claims. (Cl. 260—247.1)

This invention relates to novel dihydrothieno-[3,4-d]-pyrimidines and acid addition salts thereof, as well as to various methods of preparing these compounds.

More particularly, the present invention relates to novel dihydrothieno-[3,4-d]-pyrimidines of the formula

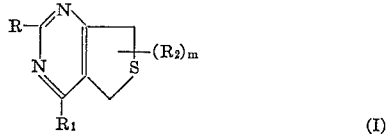

wherein

R is hydrogen, halogen, lower alkyl, aryl or aralkyl, where the aryl radicals and the aromatic moiety of the aralkyl radicals may have halogen, lower alkyl, lower alkoxy, amino, monoalkylamino or dialkylamino substituents attached thereto, hydroxy, lower alkoxy, lower alkoxy-lower alkoxy, monoalkylamino-lower alkoxy, dialkylamino-lower alkoxy, lower alkenyloxy, aralkoxy, mercapto, lower alkyl-mercapto, aralkyl-mercapto, aryl-mercapto, carbalkoxy-lower alkyl-mercapto, monoalkylaminoalkyl-mercapto, dialkylaminoalkyl-mercapto, or amino of the formula

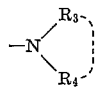

wherein $R_3$ is hydrogen, amino, phenylamino, lower alkyl, hydroxy-lower alkyl, lower alkoxy-lower alkyl, lower alkyl-thio-lower alkyl, halo-lower alkyl, amino-lower alkyl, monoalkylamino-lower alkyl, dialkylamino-lower alkyl, lower alkenyl, aryl, aralkyl, cycloalkyl or pyridyl, $R_4$ is hydrogen, lower alkyl or hydroxy-lower alkyl, or $R_3$ and $R_4$, together with each other and the adjacent nitrogen atom, form a basic heterocycle whose methylene chain may be interrupted by additional heteroatoms, such as oxygen, nitrogen and sulfur, and which may have lower alkyl or aryl substituents attached thereto, $R_1$ is hydrogen, halogen, hydroxy, lower alkoxy, lower alkoxy-lower alkoxy, monoalkylamino-lower alkoxy, dialkylamino-lower alkoxy, aralkoxy, mercapto, lower alkyl-mercapto, aryl-mercapto, aralkyl-mercapto, carbalkoxy-lower alkyl-mercapto, monoalkyl-aminoalkyl-mercapto, dialkyl-aminoalkyl-mercapto, or amino of the formula

wherein $R_3$ and $R_4$ have the same meanings as defined above, $R_2$ is lower alkyl or aryl, where the aryl radical may have halogen, lower alkyl, lower alkoxy amino, monoalkylamino or dialkylamino substituents attached thereto, and $n$ is an integer from 0 to 2, inclusive, and their non-toxic, pharmacologically acceptable acid addition salts.

The compounds of the present invention may be prepared by a number of different methods, but the following have proved to be most convenient and efficient:

*Method A*

Reaction of a tetrahydrothiophene compound of the formula

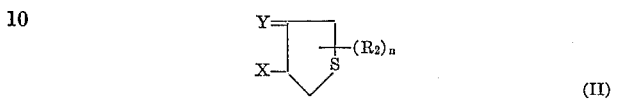

wherein $R_2$ and $n$ have the same meanings as in Formula I above, X is a reactive functional derivative of a carboxyl group and Y is oxygen or imino (=NH), with a compound of the formula

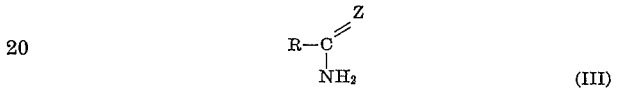

or an acid addition salt thereof or a tautomer of the formula

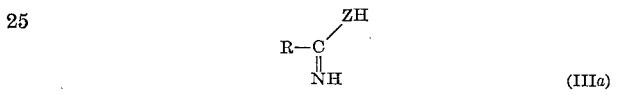

wherein R has the same meanings as in Formula I and Z is oxygen or imino; however, Z in Formulas III and IIIa cannot be oxygen when Y in Formula II is oxygen, and vice-versa. Examples of reactive functional derivatives of the tetrahydrothiophene-carboxylic acids of Formula II are their esters, nitriles, amidines, amides or thioamides. Examples of particular compounds of the Formulas III and IIIa which may be used are urea, thiourea, O-alkyl-isoureas, S-alkyl-isothioureas, carboxylic acid amides and carboxylic acid amidines, such as formamide and formamidine, guanidine and substituted guanidines.

This particular method produces compounds of the Formula I wherein R and $R_2$ have the previously indicated meanings and $R_1$ is either (a) hydroxyl, (b) mercapto or (c) a free amino group. For instance, compounds wherein $R_1$ is hydroxyl are obtained by starting from a tetrahydrothiophene compound II wherein X is carbalkoxy or carbamyl. On the other hand, compounds wherein $R_1$ is mercapto are obtained by starting from a tetrahydrothiophene compound II wherein X is a carboxylic acid thioamide radical. And compounds wherein $R_1$ is a free amino group are obtained by starting from a tetrahydrothiophene compound II wherein X is a cyano or amidine group.

The reaction is carried out at temperatures between 20 and 200° C., preferably at a pH of 8–10, and most advantageously by using about equimolar amounts of compounds II and III or IIIa in an organic solvent or in water. The selection of the most advantageous reaction temperature depends upon the reactivity of compound III or IIIa; that is, while the reaction proceeds at room temperature with such compounds of the Formula III as amidines, guanidine, O-alkyl-isoureas or S-alkyl-isothioureas, the reaction temperature must be raised to between 100 and 200° C. when compound III is urea, thiourea or formamide, depending upon the reactivity of compound II.

The tetrahydrothiophene derivatives of the Formula II, which are used as starting materials in this method, are themselves prepared by the method described by R. B. Woodward and R. H. Eastman, J.A.C.S. 68, 2229–2235 (1946), that is, by reacting reactive derivatives of acrylic acid with reactive derivatives of thioglycolic acid, for instance by reacting an acrylic acid alkyl ester with a thioglycolic acid alkyl ester in the presence of a basic condensation agent, or by the method of E. Larsson, Svensk. Chem. Tid. 57, 24 (1945).

Method B

Reaction of a dihydrothieno-[3,4-d]-pyrimidine of the formula

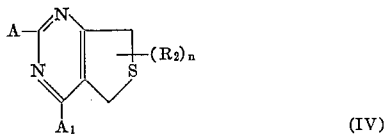

wherein $R_2$ and $n$ have the same meanings as in Formula I, and one of substituents A and $A_1$, is halogen or a free or lower alkyl-substituted mercapto group, and the other of substituents A and $A_1$ is halogen, mercapto, lower alky-mercapto or any of the other meanings included in the definition of R and $R_1$ in Formula I above, with a compound of the formula $$R_5H \qquad (V)$$

wherein $R_5$ is hydroxyl, lower alkoxy, lower alkoxy-lower alkoxy, monoalkylamino-lower alkoxy, dialkylamino-lower alkoxy, aralkoxy, mercapto, lower alkyl-mercapto, aralkyl-mercapto, aryl-mercapto, carbalkoxy-lower alkyl-mercapto, monoalkylaminoalkyl-mercapto, dialkylamino-alkyl-mercapto or amino of the formula

wherein $R_3$ and $R_4$ have the meanings defined above in connection with Formula I.

The reaction is advantageously performed in the presence of an inert organic solvent and at temperatures between 0 and 200° C. If one or both of substituents A and $A_1$ are halogen, it is necessary that the reaction be performed in the presence of a compound capable of tying up or neutralizing the hydrogen halide released by the reaction, for instance in the presence of an inorganic base or a tertiary organic base. If $R_5$ in compound V is a basic radical

compound V itself may serve as the agent for tying up the hydrogen halide; under these circumstances compound V must, however, be provided in excess over the stoichiometric amount required for reaction with compound IV, preferably at least one molar excess. A still greater excess of this amine may also serve as the organic solvent medium for the reaction.

The reaction temperature depends largely upon the reactivity of the reactants. In general, the reaction involving the exchange of a halogen for any of the other indicated groups in the presence of a compound capable of tying up the hydrogen halide proceeds at room temperature or moderately elevated temperatures. On the other hand, if the reaction involves the exchange of a mercapto group for a substituent of the formula

the reaction proceeds at temperatures between 100 and 200° C. If compound V is one having a relatively low boiling point, the reaction is advantageously performed in a closed vessel.

In the event that $R_5$ in compound V is hydroxyl, mercapto, substituted hydroxyl or substituted mercapto, it is advantageous to react compound V with a compound of the Formula IV wherein A and/or $A_1$ are halogen. If it is desired to prepare compounds of the Formula I wherein R is lower alkyl, aryl or aralkyl, the reactant IV must be one wherein A is already lower alkyl, aryl or aralkyl.

If it is desired to prepare compounds of the Formula I wherein R and $R_1$ are identical substituents, the starting compound IV wherein A and $A_1$ are any of the above exchangeable radicals is reacted with twice the molar equivalent or a larger excess of compound V. However, it is also possible to introduce non-identical substituents R and $R_1$, for instance by first exchanging $A_1$ for $R_1$ and then A for R on the dihydrothieno-pyrimidine nucleus.

Compounds of the Formula IV, which are used as starting materials in method B, may be prepared by method A. If substituents A and/or $A_1$ in Formula IV are mercapto or lower alkyl-mercapto, these compounds may be obtained directly by ring closure, for instance by reacting a 4-iminotetrahydrothiophene-5-carboxylic acid thioamide with thiourea. If one or both of substituents A and $A_1$ are to be halogen, a compound of the Formula II wherein X is a carbalkoxy group is first subjected to a ring closure reaction with urea to form the corresponding 2,4-dihydroxy-dihydrothieno-pyrimidine, which is then transformed into the corresponding 2,4-dihalo-dihydro-thieno-pyrimidine, for example with phosphorusoxychloride. The analogous 2,4-dimercapto compounds may also be obtained from the above-mentioned 2,4-dihydroxy-dihydrothieno-pyrimidines, namely, either by reacting the 2,4-dihydroxy compounds with phosphoruspentasulfide and subsequent alkylation or through the 2,4-dihalo compounds by reacting the latter with thiourea, an alkali metal hydrosulfide or an alkali metal mercaptide.

If the reaction product of method A or B is a compound of the Formula I wherein R and/or $R_1$ are hydroxyl, mercapto or amino—which is always the case for $R_1$ when method A is used—the hydrogen atoms of these groups may, if desired, be subsequently replaced by lower alkyl, lower alkoxy-lower alkyl, monoalkylamino-lower alkyl, dialkyl-lower alkyl or aralkyl according to known methods, for instance by reaction with reactive esters of the corresponding alcohols, particularly with hydrohalic acid esters or sulfonic acid esters. Aryl and pyridyl radicals may, of course, not be introduced in this manner.

If the reaction product of method A or B is a compound of the Formula I wherein one or both of substituents R and $R_1$ are mercapto or substituted mercapto, these may subsequently be exchanged for hydrogen by known methods, for instance by hydrogenation in the presence of Raney nickel. In fact, compounds of the Formula I wherein $R_1$ is hydrogen can be obtained only by this method.

Compounds of the Formula I wherein one, two or all three of substituents R, $R_1$ and $R_2$ are or comprise basic radicals, that is amino, substituted amino or basic heterocycles, may be readily converted into their acid addition salts by customary methods, namely by dissolving the free base in a suitable solvent and acidifying the solution with the desired acid. Similarly, compounds of the Formula I wherein the substituents are free hydroxyl or mercapto groups may be converted into their alkali metal salts.

The following examples further illustrate the present invention and will enable others skilled in the art to understand the invention more completely. It should be understood, however, that the present invention is not limited solely to the illustrative examples given below.

EXAMPLE I

*Preparation of 2-ethylmercapto-4-hydroxy-dihydrothieno-[3,4-d]-pyrimidine by method A*

8.4 gm. (0.05 mol) of 3-keto-tetrahydrothiophene-4-carboxylic acid ethyl ester were added dropwise at room temperature to a solution of 9.25 gm. (0.05 mol) of S-ethylisothiourea hydrobromide and 6.9 gm. (0.05 mol) of potassium carbonate in 50 cc. of water, accompanied by stirring. After a short period of time a white precipitate formed. The reaction mixture was then stirred for 15 hours at room temperature. Thereafter, the precipitate was separated by vacuum filtration and washed thoroughly with water. 9.2 gm. (86% of theory) of a white crystalline compound, which was identified to be 2-ethylmercapto-4-hydroxy-dihydrothieno-[3,4-d]-pyrimidine of the formula

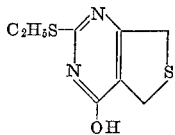

were obtained. Recrystallized from ethanol, the product had a melting point of 242–243° C.

Analysis: $C_8H_{10}N_2OS_2$; molecular weight=214.32. Calculated: C, 44.83%; H, 4.70%; N, 13.07%. Found: C, 45.01%; H, 4.89%; N, 12.98%.

Using a procedure analogous to that described above, the following additional dihydrothieno-[3,4-d]-pyrimidines were prepared:

(a) 2-ethylmercapto-4-hydroxy-5-methyl-dihydrothieno-[3,4-d]-pyrimidine of the formula

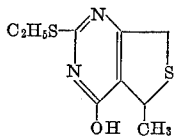

from 3-keto-5-methyl-tetrahydrothiophene-4-carboxylic acid ethyl ester and S-ethyl-isothiourea hydrobromide. Recrystallized from ethanol, the product had a melting point of 203° C.

(b) 2 - amino - 4 - hydroxy - dihydrothieno - [3,4 - d]-pyrimidine of the formula

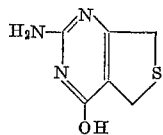

from 3-keto-tetrahydrothiophene-4-carboxylic acid ethyl ester and guanidine hydrochloride. Recrystallized from a mixture of dimethylformamide and ethanol, the product had a melting point of 326–327° C.

(c) 2-dimethylamino-4-hydroxy-dihydrothieno-[3,4-d]-pyrimidine of the formula

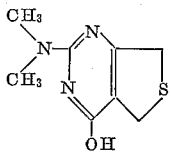

from 3-keto-tetrahydrothiophene-4-carboxylic acid ethyl ester and N,N-dimethyl-guanidine hydrochloride. Recrystallized from ethanol, the product had a melting point of 296–298° C.

(d) 2-morpholino-4 - hydroxy-5-methyl-dihydrothieno-[3,4-d]-pyrimidine of the formula

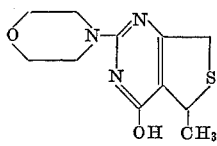

from 3-keto-5-methyl-tetrahydrothiophene - 4 - carboxylic acid ethyl ester and N-guanyl-morpholine hydrochloride. Recrystallized from ethanol, the product had a melting point of 253° C.

(e) 2-methyl-4-hydroxy - dihydrothieno-[3,4-d]-pyrimidine of the formula

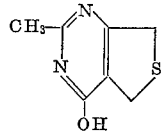

from 3-keto-tetrahydrothiophene-4-carboxylic acid ethyl ester and acetamidine hydrochloride. Recrystallized from ethanol, the product had a melting point of 274–276° C.

(f) 2-phenyl-4-hydroxy - dihydrothieno-[3,4-d]-pyrimidine of the formula

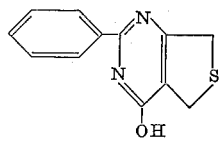

from 3-keto-tetrahydrothiophene-4-carboxylic acid ethyl ester and benzamidine hydrochloride. Recrystallized from butanol, the product had a melting point of 264–267° C. (decomposition).

(g) 2-methoxy-4-hydroxy - dihydrothieno - [3,4-d]-pyrimidine of the formula

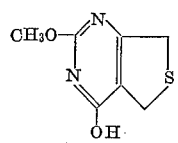

from 3-keto-tetrahydrothiophene-4-carboxylic acid ethyl ester and O-methyl-isourea hydrochloride. Recrystallized from methanol, the product had a melting point of 223–225° C. (decomposition).

(h) 2 - ethylmercapto - 4 - hydroxy-7-methyl-dihydrothieno-[3,4-d]-pyrimidine of the formula

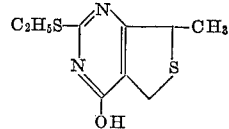

from 2 - methyl - 3 - keto - tetrahydrothiophene - 4 - carboxylic acid ethyl ester and S-ethyl-isothiourea hydrobromide. Recrystallized from ethanol, the product had a melting point of 191–192° C.

(i) 2 - amino - 4 - hydroxy - 5 - n - propyl - dihydrothieno-[3,4-d]-pyrimidine of the formula

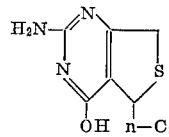

from 2 - n - propyl - 4 - keto - tetrahydrothiophene - 3-carboxylic acid ethyl ester and guanidine hydrochloride. Recrystallized from ethanol, the product had a melting point of 278–280° C.

(j) 2 - morpholino - 4 - hydroxy - 5 - n - propyl - dihydrothieno-[3,4-d]-pyrimidine of the formula

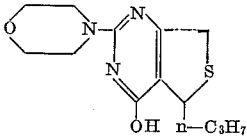

from 2 - n - propyl - 4 - keto - tetrahydrothiophene - 3-carboxylic acid ethyl ester and N-guanyl-morpholine hydrochloride. Recrystallized from ethanol, the product had a melting point of 234–235° C.

(k) *2 - pyrrolidino - 4 - hydroxy - 5 - n - propyl - dihydrothieno[3,4-d]-pyrimidine* of the formula

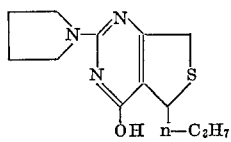

from 2 - n - propyl - 4 - keto - tetrahydrothiophene - 3 - carboxylic acid ethyl ester and N,N-tetramethyleneguanidine hydrochloride. Recrystallized from a mixture of ethanol and dimethylformamide, the produce had a melting point of 226–227° C.

(l) *2 - dimethylamino - 4 - hydroxy - 5 - n - propyl-dihydrothieno-[3,4-d]-pyrimidine* of the formula

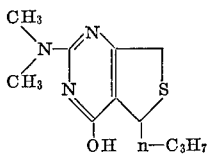

from 2 - n - propyl - 4 - keto - tetrahydrothiophene - 3 - carboxylic acid ethyl ester and N,N-dimethylguanidine hydrochloride. Recrystallized from dimethylformamide, the product had a melting point of 217–218° C.

(m) *2 - dimethylamino - 4 - hydroxy - 7 - methyl - dihydrothieno-[3,4-d]-pyrimidine* of the formula

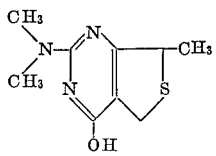

from 2 - methyl - 3 - keto - tetrahydrothiophene - 4 - carboxylic acid ethyl ester and N,N-dimethylguanidine hychloride. Recrystallized from dimethylformamide, the product had a melting point of 221–223° C.

(n) *4 - hydroxy - dihydrothieno - [3,4 - d] - pyrimidine* of the formula

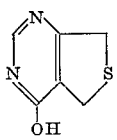

from 3 - keto - tetrahydrothiophene - 4 - carboxylic acid ethyl ester and formamidine acetate. Recrystallized from methanol, the product had a melting point of 269–271° C. (decomposition).

(o) *2 - isopropyl - 4 - hydroxy - dihydrothieno - [3,4-d]- pyrimidine* of the formula

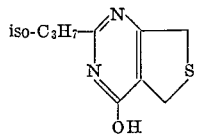

from 3-keto-tetrahydrothiophene-4-carboxylic acid ethyl ester and isobutyramidine hydrochloride. Recrystallized from ethanol, the product had a melting point of 241–242° C.

(p) *2 - methyl - 4 - hydroxy - 5 - n - propyl - dihydrothieno-[3,4-d]-pyrimidine* of the formula

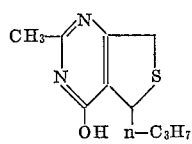

from 2 - n - propyl - 4 - keto - tetrahydrothiophene - 3 - carboxylic acid ethyl ester and acetamidine hydrochloride. Recrystallized from ethanol, the product had a melting point of 207–208° C.

(q) *2 - benzyl - 4 - hydroxy - dihydrothieno - [3,4 - d]- pyrimidine* of the formula

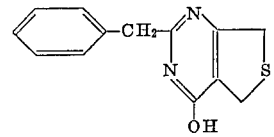

from 3-keto-tetrahydrothiophene-4-carboxylic acid ethyl ester and phenylacetamidine hydrochloride. Recrystallized from ethanol, the product had a melting point of 228–230° C.

(r) *2 - phenyl - 4 - hydroxy - 5 - methyl - dihydrothieno-[3,4-d] pyrimidine* of the formula

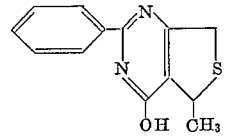

from 2 - methyl - 4 - keto - tetrahydrothiophene - 3 - carboxylic acid ethyl ester and benzamidine hydrochloride. Recrystallized from dimethylformamide the product had a melting point of 275–277° C.

(s) *2 - amino - 4 - hydroxy - 7 - isopropyl - dihydrothieno-[3,4-d]-pyrimidine* of the formula

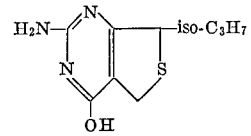

from 2 - isopropyl - 3 - keto - tetrahydrothiophene - 4 - carboxylic acid ethyl ester and guanidine hydrochloride. Recrystallized from ethanol, the product had a melting point of 222–223° C.

(t) *2 - methoxy - 4 - hydroxy - 5 - methyl - dihydrothieno - [3,4 - d] - pyrimidine* of the formula

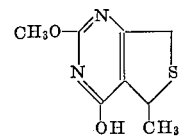

from 2 - methyl - 4 - keto - tetrahydrothiophene - 3 - carboxylic acid ethyl ester and O-methyl-isourea hydrochloride. Recrystallized from ethanol, the product had a melting point of 237–238° C.

EXAMPLE 2

*Preparation of 2,4-dihydroxy-dihydrothieno-[3,4-d]-pyrimidine by method A*

An intimate mixture of 16.0 gm. (0.264 mol) of urea, 41.5 gm. (0.238 mol) of 3-keto-tetrahydrothiophene-4-carboxylic acid ethyl ester, 5 cc. of absolute ethanol and 3 drops of concentrated hydrochloric acid was allowed to stand in a continuously evacuated exsiccator over concentrated sulfuric acid until the mixture was completely evaporated to dryness, which required about seven days. The crystalline residue was thoroughly washed with ether and was then introduced into a solution of 24 gm. of sodium hydroxide in 300 cc. of water at 95° C. The mixture was then cooled to 65° C. and was carefully acidified with concentrated hydrochloric acid. The precipitate formed thereby was separated by vacuum filtration and was then washed with water until neutral. 34 gm. (82% of theory) of raw 2,4-dihydroxy-dihydrothieno-[3,4-d]-pyrimidine of the formula

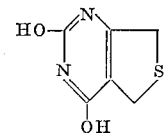

were obtained. After recrystallization from methanol, the product had a melting point of more than 300° C.

*Analysis*: C₆H₆N₂O₂S; molecular weight=170.20. Calculated: C, 42.34%; H, 3.56%; N, 16.46%. Found: C, 42.10%; H, 3.94%; N, 16.65%.

EXAMPLE 3

*Preparation of 2-mercapto-4-hydroxy-dihydrothieno-[3,4-d]-pyrimidine by method A*

3.7 gm. of thiourea (0.06 mol) were dissolved in 25 cc. of water while heating the solution to 80 C°. 15.6 gm. (0.09 mol) of 3-keto-tetrahydrothiophene-4-carboxylic acid ethyl ester were added to the solution. The resulting mixture was vigorously agitated to form an emulsion; while being agitated, 12.4 gm. of anhydrous potassium carbonate (0.09 mol) were added in small portions to the emulsion. The resulting mixture solidified accompanied by vigorous evolution of carbon dioxide. After allowing the solidified mixture to stand for two hours, it was admixed with 200 cc. of water and 20 cc. of concentrated hydrochloric acid. A precipitate formed, which was separated by vacuum filtration and washed with water. 5.2 gm. (48% of theory) of raw 2-mercapto-4-hydroxy-dihydrothieno-[3,4-d]-pyrimidine of the formula

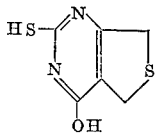

were obtained. Recrystallized from dimethylformamide, the product has a melting point of about 320° C. (decomposition).

*Analysis:* C₆H₆N₂OS₂; molecular weight=186.26. Calculated: C, 38.69%; H, 3.25%; S, 34.43%. Found: C, 38.90%; H, 3.35%; S, 34.50%.

EXAMPLE 4

*Preparation of 2-morpholino-4-hydroxy-dihydrothieno-[3,4-d]-pyrimidine by method B*

A mixture of 5 gm. (0.023 mol) of 2-ethylmercapto-4-hydroxy-dihydrothieno-[3,4,d-]-pyrimidine and 40 cc. of morpholine was refluxed on an oil bath for 30 hours accompanied by stirring (bath temperature 140° C.); after about three hours of refluxing a precipitate began to form. The reaction mixture was allowed to cool and was then poured into 150 cc. of ether. The crystalline portion of the resulting mixture was separated by vacuum filtration and was washed with ether. 4.0 gm. (73% of theory) of a white crystalline compound were obtained, which was identified to be raw 2-morpholino-4-hydroxy-dihydrothieno-[3,4-d]-pyrimidine of the formula

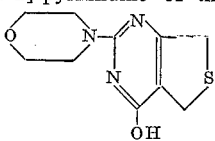

After recrystallization from dimethylformamide the product had a melting point of about 320° C. (decomposition).

*Analysis:* C₁₀H₁₃N₃O₂S; molecular weight=239.30. Calculated: C, 50.19%; H, 5.48%; N, 17.56%. Found: C, 50.01%; H, 5.65%; N, 17.45%.

Using a procedure analogous to that described above, the following additional dihydrothieno-[3,4-d]-pyrimidines were prepared:

(a) *2 - (2' - methyl-morpholino)-4-hydroxy-dihydrothieno-[3,4-d]-pyrimidine* of the formula

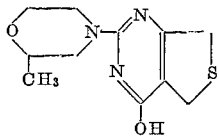

from 2 - ethylmercapto-4-hydroxy-dihydrothieno-[3,4-d]-pyrimidine and 2 - methyl-morpholine. Recrystallized from dimethylformamide, the product had a melting point of 259–161° C. The yield was 81% of theory.

(b) *2 - piperidino-4-hydroxy-dihydrothieno-[3,4-d]-pyrimidine* of the formula

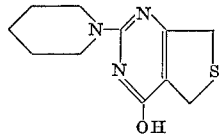

from 2 - ethylmercapto-4-hydroxy-dihydrothieno-[3,4-d]-pyrimidine and piperidine. Recrystallized from dimethylformamide, the product had a melting point of 282–283° C. The yield was 73% of theory.

(c) *2 - (N' - methyl-piperazino)-4-hydroxy-dihydrothieno-[3,4-d]-pyrimidine* of the formula

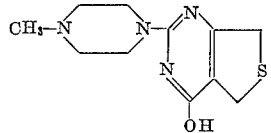

from 2 - ethylmercapto-4-hydroxy-dihydrothieno-[3,4-d]-pyrimidine and N-methyl-piperazine. Recrystallized from ethanol, the product had a melting point of 254–256° C. The yield was 87% of theory.

(d) *2 - pyrrolidino - 4 - hydroxy-dihydrothieno-[3,4-d]-pyrimidine* of the formula

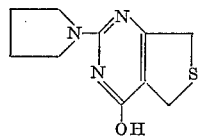

from 2 - ethylmercapto-4-hydroxy-dihydrothieno-[3,4-d]-pyrimidine and pyrrolidine. Recrystallized from dimethylformamide, the product had a melting point of 303–305° C. The yield was 90% of theory.

(e) *2 - morpholino - 4 - hydroxy-7-methyl-dihydrothieno-[3,4-d]-pyrimidine* of the formula

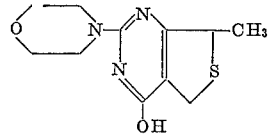

from 2 - ethylmercapto - 4 - hydroxy-7-methyl-dihydrothieno-[3,4-d]-pyrimidine and morpholine. Recrystallized from ethanol, the product had a melting point of 253° C. The yield was 83% of theory.

(f) *2 - (N' - methyl-piperazino)-4-hydroxy-5-methyl-dihydrothieno-[3,4-d]-pyrimidine* of the formula

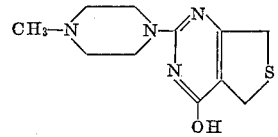

from 2-ethylmercapto-4-hydroxy-5-methyl-dihydrothieno-[3,4-d]-pyrimidine and N-methyl-piperazine. Recrystallized from dimethyl-formamide, the product had a melting point of 256–257° C. The yield was 70% of theory.

(g) *2-morpholino-4-hydroxy-7-methyl-dihydrothieno-[3,4-d]-pyrimidine* of the formula

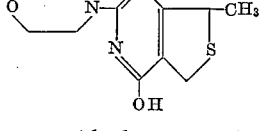

from 2-ethylmercapto-4-hydroxy-7-methyl-dihydrothieno-[3,4-d]-pyrimidine and morpholine. Recrystallized from dimethylformamide, the product had a melting point of 232–233° C. The yield was 90% of theory.

(h) *2-pyrrolidino-4-hydroxy-7-methyl - dihydrothieno-[3,4-d]-pyrimidine* of the formula

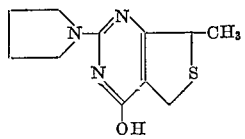

from 2-ethylmercapto-4-hydroxy-7-methyl-dihydrothieno-[3,4-d]-pyrimidine and pyrrolidine. Recrystallized from dimethyl-formamide, the product had a melting point of 255–257° C. The yield was 69% of theory.

EXAMPLE 5

*Preparation of 2-methylamino-4-hydroxy-dihydrothieno-[3,4-d]-pyrimidine by method B*

A mixture of 10.7 gm. (0.05 mol) of 2-ethylmercapto-4-hydroxy-dihydrothieno-[3,4-d]-pyrimidine and 60 cc. of methylamine was heated in an autoclave for 14 hours at 150° C. After allowing the reaction mixture to cool, the excess unreacted methylamine was distilled off, and the residue was washed with ether. 8.5 gm. (93% of theory) of raw 2-methylamino-4-hydroxy-dihydrothieno-[3,4-d]-pyrimidine of the formula

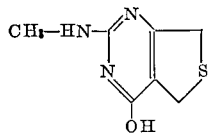

were obtained. After recrystallization from dimethylformamide the product had a melting point of 335–337° C.

*Analysis*: $C_7H_9N_3OS$; molecular weight=183.24. Calculated: C, 45.88%; H, 4.94%; N, 22.93. Found: C, 46.00%; H, 5.28%; N, 22.77%.

Using a procedure analogous to that described above, the following 2-amino-dihydrothieno-[3,4-d]-pyrimidines were prepared:

(ad) *2-dimethylamino-4-hydroxy - 5 - methyl-dihydrothieno-[3,4-d]-pyrimidine* from 2 - ethylmercapto-4-hydroxy-5-methyl-dihydrothieno-[3,4-d]-pyrimidine and dimethylamine. Recrystallized from dimethylformamide the product had a melting point of 243–245° C. The yield was 95% of theory.

(a) *2-dimethylamino - 4 - hydroxy-dihydrothieno-[3,4-d]-pyrimidine* of the formula

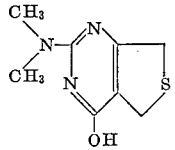

from 2-ethylmercapto-4-hydroxy - dihydrothieno-[3,4-d]-pyrimidine and dimethylamine. Recrystallized from ethanol, the product had a melting point of 296–298° C. The yield was 96% of theory.

(b) *2-isopropylamino-4-hydroxy - dihydrothieno-[3,4-d]-pyrimidine* of the formula

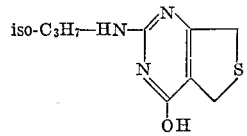

from 2-ethylmercapto-4-hydroxy - dihydrothieno-[3,4-d]-pyrimidine and isopropylamine. Recrystallized from ethanol, the product had a melting point of 231–233° C. The yield was 87% of theory.

(c) *2-amino-4-hydroxy - dihydrothieno-[3,4-d]-pyrimidine* of the formula

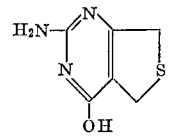

from 2-ethylmercapto-4-hydroxy - dihydrothieno-[3,4-d]-pyrimidine and ammonia. Recrystallized from dimethylformamide, the product had a melting point of 326–327° C. The yield was 76% of theory.

EXAMPLE 6

*Preparation of 2-morpholino-4-chloro-dihydrothieno-[3,4-d]-pyrimidine by method B*

A mixture of 3 gm. (0.0125 mol) of 2-morpholino-4-hydroxy-dihydrothieno-[3,4-d]-pyrimidine and 20 cc. of phosphorus oxychloride was refluxed for two hours. A clear solution was obtained. The unreacted, excess phosphorus oxychloride was distilled off in vacuo; the viscous residue was admixed with ice water; the aqueous mixture was adjusted to a pH of 8 with 2 N sodium hydroxide, and the alkaline solution was extracted with chloroform. The chloroform was distilled off in vacuo from the extract solution, leaving a yellow crystalline substance. 2 gm. (62% of theory) of raw 2-morpholino-4-chloro-dihydrothieno-[3,4-d]-pyrimidine of the formula

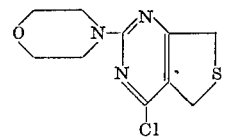

were obtained. After recrystallization from dimethylformamide, the product had a melting point of 162–163° C.

*Analysis.*—$C_{10}H_{12}ClN_3OS$; molecular weight=257.75. Calculated: C, 46.60%; H, 4.69%; Cl, 13.76%. Found: C, 46.47%; H, 4.83%; Cl, 13.65%.

Using a procedure analogous to that described above, the following additional 4-chloro-substituted dihydrothieno-[3,4-d]-pyrimidines were prepared:

(a) *2-(2'-methyl-morpholino) - 4 - chloro-dihydrothieno-[3,4-d]-pyrimidine* of the formula

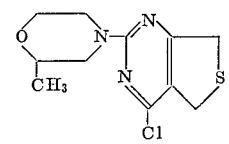

from 2-(2'-methyl-morpholino) - 4 - hydroxy-dihydrothieno-[3,4-d]-pyrimidine and phosphorus oxychloride. Recrystallized from ethanol, the product had a melting point of 117–119° C. The yield was 69% of theory.

(b) *2-piperidino - 4 -chloro-dihydrothieno-[3,4-d]-pyrimidine* of the formula

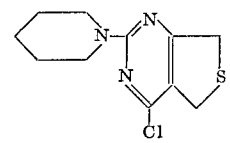

from 2-piperidino - 4 - hydroxy-dihydrothieno-[3,4-d]-pyrimidine and phosphorus oxychloride. Recrystallized from ethanol, the product had a melting point of 110–112° C. The yield was 75% of theory.

(c) *2-pyrrolidino - 4 - chloro - dihydrothieno-[3,4-d]-pyrimidine* of the formula

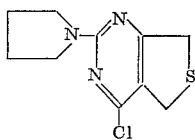

from 2-pyrrolidino - 4 - hydroxy - dihydrothieno-[3,4-d]-pyrimidine and phosphorus oxychloride. Recrystallized from ethanol, the product had a meting point of 111–113° C. The yield was 90% of theory.

(d) *2-(N' - methyl - piperazino) - 4 - chloro - dihydro-thieno-[3,4-d]-pyrimidine* of the formula

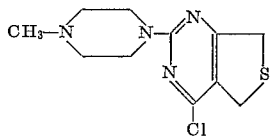

from 2-(N'-methyl - piperazino) - 4 - hydroxy - dihydro-thieno-[3,4-d]-pyrimidine and phosphorus oxychloride. Recrystallized from ethanol, the product had a melting point of 133–135° C. The yield was 87% of theory.

(e) *2-methylamino - 4 - chloro-dihydrothieno-[3,4-d]-pyrimidine* of the formula

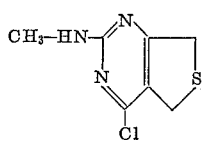

from 2-methylamino - 4 - hydroxy-dihydrothieno-[3,4-d]-pyrimidine and phosphorus oxychloride. Recrystallized from ethanol, the product had a melting point of 190–191° C. The yield was 54% of theory.

(f) *2-dimethylamino - 4 - chloro-dihydrothieno-[3,4-d]-pyrimidine* of the formula

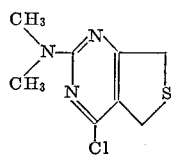

from 2-dimethylamino - 4 - hydroxy-dihydrothieno-[3,4-d]-pyrimidine and phosphorus oxychloride. Recrystallized from ethanol, the product had a melting point of 111–113° C. The yield was 61% of theory.

(g) *2-methyl - 4 - chloro - dihydrothieno-[3,4-d]-pyrimidine* of the formula

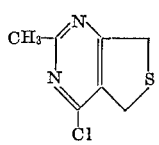

from 2 - methyl - 4 - hydroxy - dihydrothieno - [3,4 - d]-pyrimidine and phosphorus oxychloride. Recrystallized from methanol, the product had a melting point of 70–72° C. The yield was 62% of theory.

(h) *2 - methoxy - 4 - chloro - dihydrothieno - [3,4-d]-pyrimidine* of the formula

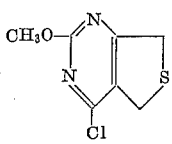

from 2 - methoxy - 4 - hydroxy - dihydrothieno - [3,4-d]-pyrimidine and phosphorus oxychloride. Recrystallized from ethanol, the product had a melting point of 84–85° C. The yield was 57% of theory.

(i) *2 - morpholino - 4 - chloro - 5 - methyl - dihydro-thieno-[3,4-d]-pyrimidine* of the formula

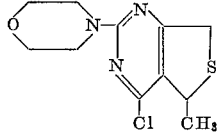

from 2 - morpholino - 4 - hydroxy - 5 - methyl - dihydro-thieno-[3,4-d]-pyrimidine and phosphorus oxychloride. Recrystallized from ethanol, the product had a melting point of 126° C. The yield was 81% of theory.

(j) *2 - morpholino - 4 - chloro - 5 - n - propyl - dihydrothieno-[3,4-d]-pyrimidine* of the formula

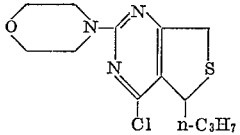

from 2 - morpholino - 4 - hydroxy - 5 - n - propyl - dihydrothieno-[3,4-d]-pyrimidine and phosphorus oxychloride. Recrystallized from ethanol, the product had a melting point of 63–64° C. The yield was 66% of theory.

(k) *2-(N'-methyl - piperazino)-4-chloro - 5 - methyl-dihydrothieno-[3,4-d]-pyrimidine* of the formula

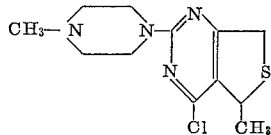

from 2 - (N' - methyl - piperazino) - 4 - hydroxy - 5-methyl-dihydrothieno-[3,4-d]-pyrimidine and phosphorus oxychloride. Recrystallized from ethanol, the product had a melting point of 110–111° C. The yield was 68% of theory.

(l) *2 - dimethylamino - 4 - chloro - 5 - methyl - dihydrothieno-[3,4-d]-pyrimidine* of the formula

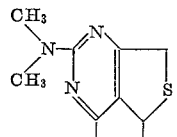

from 2 - dimethylamino - 4 - hydroxy - 5 - methyl - dihydrothieno-[3,4-d]-pyrimidine and phosphorus oxychloride. Recrystallized from ethanol, the product had a melting point of 58–59° C. The yield was 79% of theory.

(m) *2 - dimethylamino - 4 - chloro - 5 - n - propyl - dihydrothieno-[3,4-d]-pyrimidine* of the formula

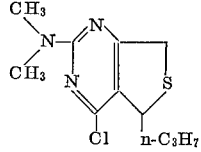

from 2 - dimethylamino - 4 - hydroxy - 5 - n - propyl - dihydrothieno-[3,4-d]-pyrimidine and phosphorus oxychloride. Recrystallized from ethanol, the product had a melting point of 45–46° C. The yield was 47% of theory.

(n) *2 - methyl - 4 - chloro - 5 - n - propyl - dihydrothieno-[3,4-d]-pyrimidine* of the formula

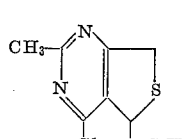

from 2 - methyl - 4 - hydroxy - 5 - n - propyl - dihydrothieno-[3,4-d]-pyrimidine and phosphorus oxychloride.

Recrystallized from methanol, the product had a melting point of 30–32° C. The yield was 59% of theory.

(o) *2-phenyl-4-chloro - 5 - methyl - dihydrothieno-[3,4-d]-primidine* of the formula

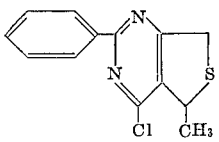

from 2-phenyl-4-hydroxy-5-methyl-dihydrothieno-[3,4-d]-pyrimidine and phosphorus oxychloride. Recrystallized from ethanol, the product had a melting point of 34–36° C. The yield was 63% of theory.

(p) *2-morpholino - 4 - chloro-7-methyl-dihydrothieno-[3,4-d]-pyrimidine* of the formula

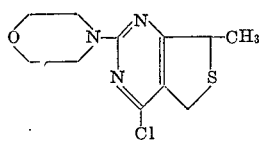

from 2-morpholino-4-hydroxy-7-methyl - dihydrothieno-[3,4-d]-pyrimidine and phosphorus oxychloride. Recrystallized from ethanol, the product had a melting point of 94–95° C. The yield was 84% of theory.

(q) *2-pyrrolidino-4-chloro - 7 - methyl - dihydrothieno-[3,4-d]-pyrimidine* of the formula

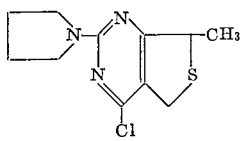

from 2-pyrrolidino-4-hydroxy - 7 - methyl-dihydrothieno-[3,4-d]-pyrimidine and phosphorus oxychloride. Recrystallized from ethanol, the product had a melting point of 80–81° C. The yield was 75% of theory.

(r) *2-phenyl - 4 - chloro-dihydrothieno-[3,3-d]-pyrimidine* of the formula

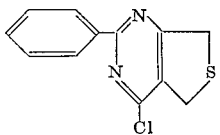

from 2-phenyl-4-hydroxy - dihydrothieno-[3,4-d]-pyrimidine and phosphorus oxychloride. Recrystallized from ethanol, the product had a melting point of 144–145° C. The yield was 52% of theory.

EXAMPLE 7

*Preparation of 2,4-dimorpholino-dihydrothieno-[3,4-d]-pyrimidine by method B*

A mixture of 5.15 gm. (0.02 mol) of 2-morpholino-4-chloro-dihydrothieno-[3,4-d]-pyrimidine and 30 cc. of morpholine was refluxed on an oil bath for four hours (bath temperature 150° C.). The clear solution obtained thereby was allowed to cool, whereby a precipitate separated out, which was isolated by vacuum filtration and washed with ether. 4.7 gm. (76% of theory) of a white crystalline substance were obtained, which was identified to be raw 2,4-dimorpholino-dihydrothieno-[3,4-d]-pyrimidine of the formula

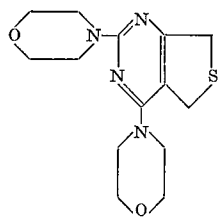

recrystallized from ethanol, the compound had a melting point of 191–193° C.

*Analysis*: $C_{14}H_{20}N_4O_2S$; molecular weight=308.41. Calculated: C, 54.52%; H, 6.54%; N, 18.17%. Found: C, 54.60%; H, 6.82%; N, 18.25%.

Using a procedure analogous to that described above, the following adidtional 2,4-basic disubstituted dihydro-thieno-[3,4-d]-pyrimidines were prepared:

(a) *2,4-dimorpholino-5-methyl - dihydrothieno-[3,4-d]-pyrimidine* of the formula

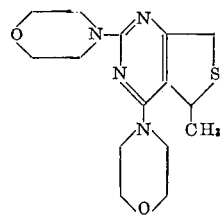

from 2-morpholino-4-chloro-5-methyl - dihydrothieno-[3,4-d]-pyrimidine and morpholine. Recrystallized from ethanol, the product had a melting point of 128–129° C. The yield was 63% of theory.

(b) *2 - (N' - methyl-piperazino)-4-pyrrolidino-dihydrothieno-[3,4-d]-pyrimidine* of the formula

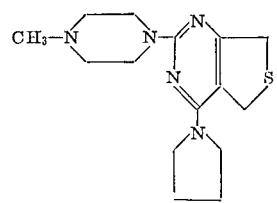

from 2 - (N'-methyl-piperazino)-4-chloro-dihydrothieno-[3,4-d]-pyrimidine and pyrrolidine. Recrystallized from 70% ethanol, the product had a melting point of 141–142° C. The yield was 64% of theory.

(c) *2-(N'-methyl-piperazino)-4-(γ-methoxy-n-propylamino)-dihydrothieno-[3,4-d]-pyrimidine* of the formula

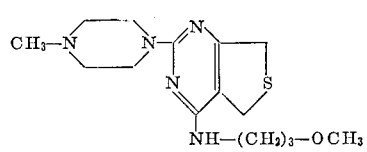

from 2 - (N'-methyl-piperazino)-4-chloro-dihydrothieno-[3,4-d]-pyrimidine and γ-methoxy-n-propylamine. Recrystallized from petroleum ether, the product had a melting point of 106–107° C. The yield was 51% of theory.

(d) *2,4 - bis - (N' - methyl-piperazino)-dihydrothieno-[3,4-d]-pyrimidine* of the formula

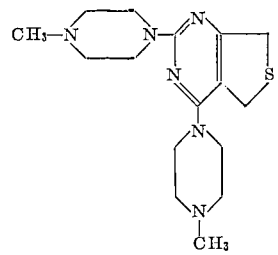

from 2 - (N'-methyl-piperazino)-4-chloro-dihydrothieno-[3,4-d]-pyrimidine and N-methyl-piperazine. Recrystallized from ethanol, the product had a melting point of 123–125° C. The yield was 59% of theory.

(e) *2-methylamino-4-morpholino-dihydrothieno-[3,4-d]-pyrimidine* of the formula

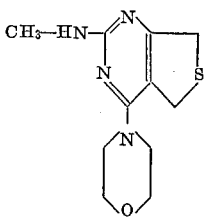

from 2-methylamino-4-chloro-dihydrothieno-[3,4-d]-pyrimidine and morpholine. Recrystallized from ethanol, the product had a melting point of 215–216° C. The yield was 53% of theory.

(f) *2-dimethylamino-4-morpholino-dihydrothieno-[3,4-d]-pyrimidine* of the formula

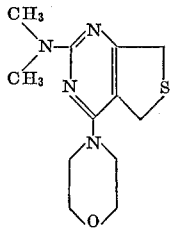

from 2-dimethylamino-4-chloro-dihydrothieno-[3,4-d]-pyrimidine and morpholine. Recrystallized from ethyl acetate, the product had a melting point of 158–160° C. The yield was 61% of theory.

(g) *2 - isopropylamino - 4 - morpholino-dihydrothieno-[3,4-d]-pyrimidine* of the formula

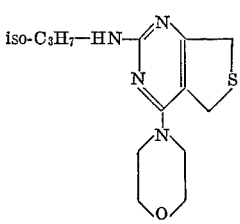

from 2 - isopropylamino-4-chloro-dihydrothieno-[3,4-d]-pyrimidine and morpholine. Recrystallized from ethanol, the product had a melting point of 99–101° C. The yield was 47% of theory.

(h) *2 - morpholino - 4 - anilino-dihydrothieno-[3,4-d]-pyrimidine* of the formula

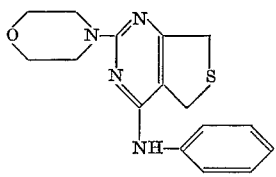

from 2-morpholino-4-chloro-dihydrothieno-[3,4-d]-pyrimidine and aniline. Recrystallized from butanol, the product had a melting point of 202–203° C. The yield was 63% of theory.

(i) *2 - morpholino - 4 - isobutylamino - dihydrothieno-[3,4-d]-pyrimidine* of the formula

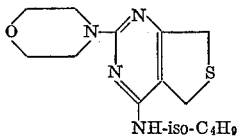

from 2-morpholino-4-chloro-dihydrothieno-[3,4-d]-pyrimidine and isobutylamine. Recrystallized from methanol, the product had a melting point of 138–139° C. The yield was 67% of theory.

(j) *2 - morpholino - 4 - isoamylamino - dihydrothieno-[3,4-d]-pyrimidine* of the formula

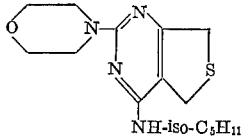

from 2-morpholino-4-chloro-dihydrothieno-[3,4-d]-pyrimidine and isoamylamine. Recrystallized from methanol, the product had a melting point of 154–155° C. The yield was 46% of theory.

(k) *2 - morpholino - 4 - allylamino - dihydrothieno-[3,4-d]-pyrimidine* of the formula

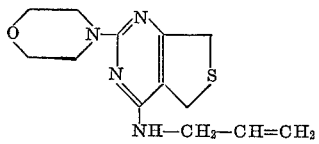

from 2-morpholino-4-chloro-dihydrothieno-[3,4-d]-pyrimidine and allylamine. Recrystallized from ethanol, the product had a melting point of 160–161° C. The yield was 67% of theory.

(l) *2-piperidino - 4 - isobutylamino - dihydrothieno-[3,4-d]-pyrimidine* of the formula

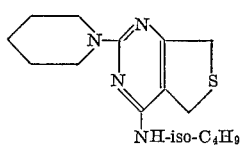

from 2-piperidino-4-chloro-dihydrothieno-[3,4-d]-pyrimidine and isobutylamine. Recrystallized from methanol, the product had a melting point of 147–148° C. The yield was 53% of theory.

(m) *2 - piperidino - 4 - isoamyl - dithydrothieno-[3,4-d]-pyrimidine* of the formula

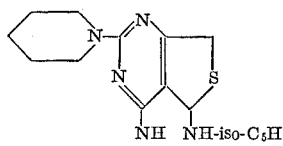

from 2-piperidino-4-chloro-dihydrothieno-[3,4-d]-pyrimidine and isoamyl amine. Recrystallized from methanol, the product had a melting point of 141–142° C. The yield was 38% of theory.

(n) *2 - pyrrolidino - 4-isobutylamino-dihydrothieno-[3,4-d]-pyrimidine* of the formula

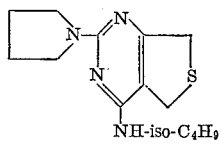

from 2-pyrrolidino-4-chloro-dihydrothieno-[3,4-d]-pyrimidine land isobutylamine. Recrystallized from diethylether, the product had a melting point of 139–141° C. The yield was 29% of theory.

(o) *2 - morpholino - 4 - (β - hydroxyethyl - ethylamino) - dihydrothieno - [3,4-d] - pyrimidine* of the formula

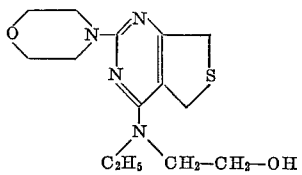

from 2 - morpholino - 4 - chloro-dihydrothieno - [3,4 - d]-pyrimidine and β-hydroxyethyl-ethylamine. Recrystallized from ethanol, the product had a melting point of 140–142° C. The yield was 56% of theory.

(p) 2 - (2'-methyl-morpholino) - 4 - (β-hydroxyethyl-methylamino) - dihydrothieno - [3,4-d] - pyrimidine of the formula

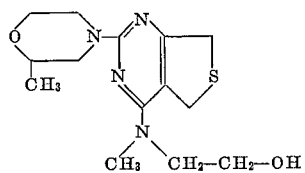

from 2 - (2' - methyl-morpholino) - 4 - chloro-dihydrothieno - [3,4-d] - pyrimidine and β - hydroxyethyl-methylamine. Recrystallized from ethanol, the product had a melting point of 143–144° C. The yield was 39% of theory.

(q) 2 - pyrrolidino - 4 - (β - hydroxyethyl - ethylamino) - dihydrothieno - [3,4-d] - pyrimidine of the formula

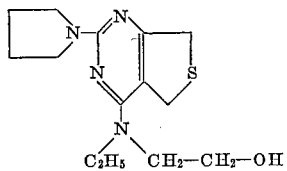

from 2 - pyrrolidino - 4 - chloro - dihydrothieno - [3,4-d]-pyrimidine and β-hydroxyethyl-ethylamine. Recrystallized from methanol, the product had a melting point of 136° C. The yield was 53% of theory.

(r) 2 - morpholino - 4 - piperidino - dihydrothieno - [3,4-d]-pyrimidine of the formula

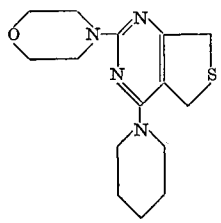

from 2 - morpholino - 4 - chloro-dihydrothieno - [3,4-d]-pyrimidine and piperidine. Recrystallized from ethyl acetate, the product had a melting point of 139–140° C. The yield was 64% of theory.

(s) 2 - morpholino - 4 - pyrrolidino - dihydrothieno - [3,4-d]-pyrimidine of the formula

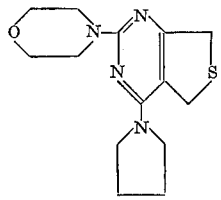

from 2 - morpholino - 4 - chloro - dihydrothieno - [3,4-d]-pyrimidine and pyrrolidine. Recrystallized from ethanol, the product had a melting point of 186–188° C. The yield was 59% of theory.

(t) 2 - morpholino - 4 - (2' - methyl - morpholino) - dihydrothieno-[3,4-d]-pyrimidine of the formula

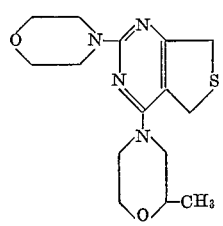

from 2 - morpholino - 4 - chloro - dihydrothieno - [3,4-d]-pyrimidine and 2-methyl-morpholine. Recrystallized from ethanol, the product had a melting point of 165–166° C. The yield was 56% of theory.

(u) 2 - morpholino - 4 - (N' - methyl - piperazino) - dihydrothieno - [3,4-d] - pyrimidine of the formula

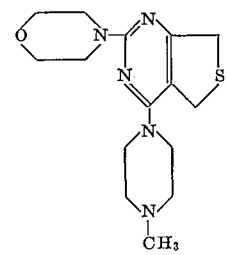

from 2 - morpholino - 4 - chloro - dihydrothieno - [3,4-d]-pyrimidine and N-methyl-piperazine. Recrystallized from ethanol, the product had a melting point of 165–166° C. The yield was 73% of theory.

(v) 2 - (2' - methyl - morpholino) - 4 - morpholino - dihydrothieno - [3,4-d] - pyrimidine of the formula

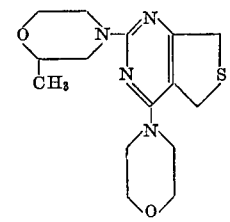

from 2 - (2' - methyl-morpholino) - 4 - chloro - dihydrothieno - [3,4-d] - pyrimidine and morpholine. Recrystallized from methanol, the product had a melting point of 136–138° C. The yield was 50% of theory.

(w) 2,4 - bis - (2'- methyl-morpholino)-dihydrothieno-[3,4-d]-pyrimidine of the formula

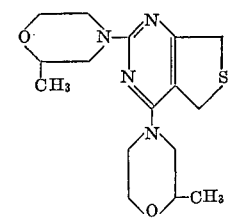

from 2-(2'-methyl-morpholino)-4-chloro-dihydrothieno-[3,4-d]-pyrimidine and 2-methyl-morpholine. Recrystallized from 70% ethanol, the product had a melting point of 111–112° C. The yield was 45% of theory.

(x) 2-pyrrolidino-4-morpholino-dihydrothieno-[3,4-d]-pyrimidine of the formula

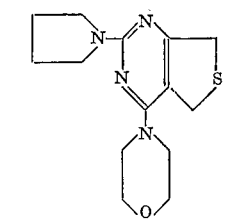

from 2-pyrrolidino-4-chloro-dihydrothieno-[3,4-d]-pyrimidine and morpholine. Recrystallized from ethanol, the product had a melting point of 172–173° C. The yield was 52% of theory.

(y) 2,4-dipyrrolidino-dihydrothieno-[3,4-d]-pyrimidine of the formula

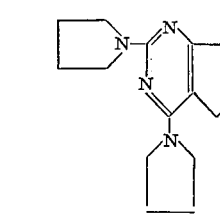

from 2-pyrrolidino-4-chloro-dihydrothieno-[3,4-d]-pyrimidine and pyrrolidine. Recrystallized from ethanol, the product had a melting point of 153–154° C. The yield was 63% of theory.

(z) 2 - *pyrrolidino-4-(2'-methyl-morpholino)-dihydrothieno-[3,4-d]-pyrimidine* of the formula

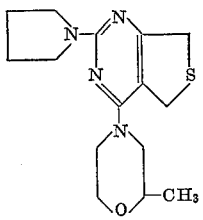

from 2-pyrrolidino-4-chloro-dihydrothieno-[3,4-d]-pyrimidine and 2-methyl-morpholine. Recrystallized from methanol, the product had a melting point of 157–159° C. The yield was 74% of theory.

(aa) *2-piperidino-4-morpholino-dihydrothieno-[3,4-d]-pyrimidine* of the formula

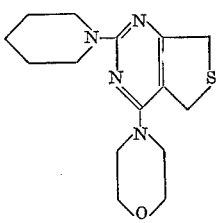

from 2-piperidino-4-chloro-dihydrothieno-[3,4-d]-pyrimidine and morpholine. Recrystallized from ethanol, the product had a melting point of 123–125° C. The yield was 69% of theory.

(bb) *2 - (N' - methyl-piperazino)-4-piperidino-dihydrothieno-[3,4-d]-pyrimidine* of the formula

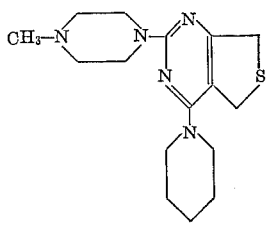

from 2-(N'-methyl-piperazino)-4-chloro-dihydrothieno-[3,4-d]-pyrimidine and piperidine. Recrystallized from ethanol, the product had a melting point of 108–109° C. The yield was 71% of theory.

EXAMPLE 8

*Preparation of 2-morpholino-4-benzylamino-dihydrothieno-[3,4-d]-pyrimidine by method B*

A mixture of 5.14 gm. (0.02 mol) of 2-morpholino-4-chloro-dihydrothieno-[3,4-d]-pyrimidine and 50 cc. of benzylamine was heated on an oil bath for five hours at 150° C. (bath temperature). A clear solution was obtained, which was allowed to cool and was then poured into water. The precipitate formed thereby was separated by vacuum filtration and washed with water. 4.1 gm. (62% of theory) of a white crystalline substance were obtained, which was identified to be raw 2-morpholino-4-benzylamino-dihydrothieno-[3,4-d]-pyrimidine of the formula

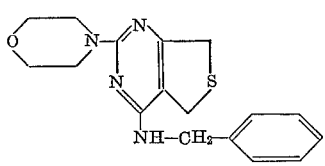

After recrystallization from ethanol the compound had a melting point of 168–170° C.

*Analysis.*—$C_{17}H_{20}N_4OS$; molecular weight=328.45. Calculated: C, 62.17%; H, 6.14%; N, 17.06%. Found: C, 62.20%; H, 6.35%; N, 17.18%.

Using a procedure analogous to that described above, the following additional 2,4-basic disubstituted dihydrothieno-[3,4-d]-pyrimidines were prepared:

(a) *2-morpholino-4-cyclohexylamino - dihydrothieno-[3,4-d]-pyrimidine* of the formula

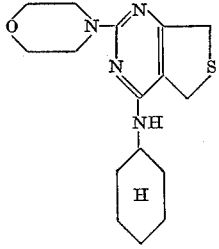

from 2-morpholino-4-chloro-dihydrothieno - [3,4-d] - pyrimidine and cyclohexylamine. Recrystallized from ethanol, the product had a melting point of 147–148° C. The yield was 58% of theory.

(b) *2-dimethylamino-4-(2' - methyl - morpholino) - 7-methyl-dihydrothieno-[3,4-d]-pyrimidine* of the formula

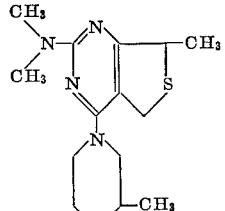

from 2-dimethylamino-4-chloro-7-methyl-dihydrothieno-[3,4-d]-pyrimidine and 2-methyl-morpholine. Recrystallized from ethanol, the product had a melting point of 85–86° C. The yield was 47% of theory.

(c) *2-(2'-methyl-morpholino)-4 - benzylamino - dihydrothieno-[3,4-d]-pyrimidine* of the formula

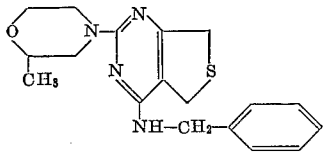

from 2-(2'-methyl-morpholino)-4-chloro-dihydrothieno-[3,4-d] - pyrimidine and benzylamine. Recrystallized from 70% methanol, the product had a melting point of 138–140° C. The yield was 39% of theory.

(d) *2-pyrrolidino-4-benzylamino-dihydrothieno - [3,4-d]-pyrimidine* of the formula

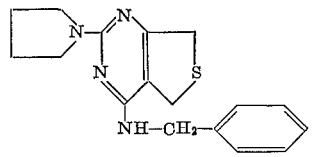

from 2-pyrrolidino-4-chloro-dihydrothieno - [3,4-d] - pyrimidine and benzylamine. Recrystallization from ethanol, the product had a melting point of 151–152° C. The yield was 43% of theory.

(e) *2-morpholino-4-n-propylamino-dihydrothieno-[3,4-d]-pyrimidine* of the formula

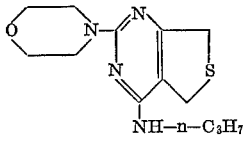

from 2-morpholino-4-dihydrothieno-[3,4-d] - pyrimidine and n-propylamine. Recrystallized from ethanol, the product had a melting point of 163–165° C. The yield was 46% of theory.

(f) *2-morpholino-4-n-butylamino-dihydrothieno - [3,4-d]-pyrimidine* of the formula

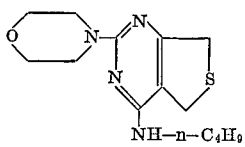

from 2-morpholino-4-chloro-dihydrothieno-[3,4-d]-pyrimidine and n-butylamine. Recrystallized from ethanol, the product had a melting point of 132–133° C. The yield was 55% of theory.

(g) *2-(2'-methyl-morpholino)-4-n-propylamino - dihydrothieno-[3,4-d]-pyrimidine* of the formula

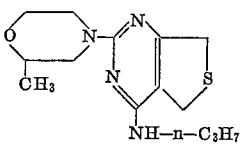

from 2-(2'-methyl-morpholino)-4-chloro - dihydrothieno-[3,4-d]-pyrimidine and n-propylamine. Recrystallized from ethanol, the product had a melting point of 136° C. The yield was 53% of theory.

(h) *2-(2'-methyl-morpholino)-4-isobutylamino - dihydrothieno-[3,4-d]-pyrimidine* of the formula

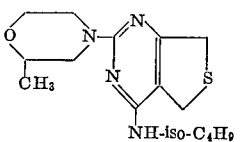

from 2-(2'-methyl-morpholino)-4-chloro - dihydrothieno-[3,4 - d]-pyrimidine and isobutylamine. Recrystallized from methanol, the product had a melting point of 147–148° C. The yield was 41% of theory.

(i) *2-(2'-methyl - morpholino)-4-isoamyl - dihydrothieno-[3,4-d]-pyrimidine* of the formula

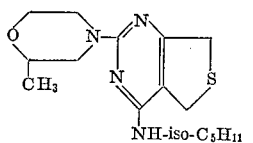

from 2-(2'-methyl-morpholino)-4-chloro - dihydrothieno-[3,4-d]-pyrimidine and isoamylamine. Recrystallized from ethanol, the product had a melting point of 108–109° C. The yield was 62% of theory.

(j) *2-pyrrolidino-4-isoamylamino - dihydrothieno-[3,4-d]-pyrimidine* of the formula

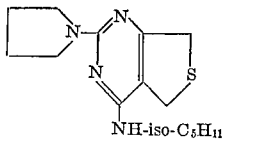

from 2-pyrrolidino-4-chloro-dihydrothieno-[3,4-d]-pyrimidine and isoamylamine. Recrystallized from 70% ethanol, the product had a melting point of 135–136° C. The yield was 31% of theory.

(k) *2-(N'-methyl-piperazino)-4-n - propylamino-dihydrothieno-[3,4-d]-pyrimidine* of the formula

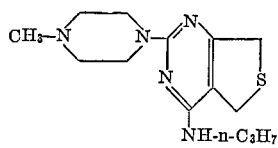

from 2-(N'-methyl-piperazino)-4-chloro - dihydrothieno-[3,4-d]-pyrimidine and n-propylamine. Recrystallized from cyclohexane, the product had a melting point of 133–134° C. The yield was 32% of theory.

(l) *2-morpholino-4-ethanolamino - dihydrothieno-[3,4-d]-pyrimidine* of the formula

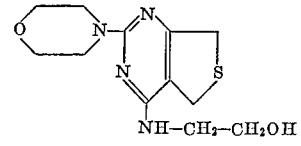

from 2-morpholino-4-chloro-dihydrothieno-[3,4-d]-pyrimidine and ethanolamine. Recrystallized from ethanol, the product had a melting point of 165–166° C. The yield was 57% of theory.

(m) *2 - morpholino-4-diethanolamino - dihydrothieno-[3,4-d]-pyrimidine* of the formula

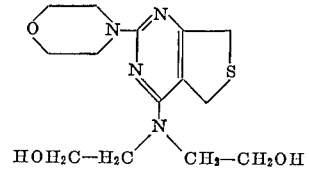

from 2-morpholino-4-chloro-dihydrothieno-[3,4-d]-pyrimidine and diethanolamine. Recrystallized from ethanol, the product had a melting point of 153–154° C. The yield was 31% of theory.

(n) *2-morpholino-4-(β - hydroxyethyl - methylamino)-dihydrothieno-[3,4-d]-pyrimidine* of the formula

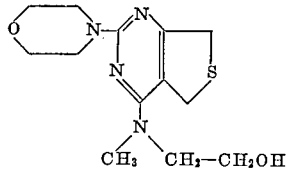

from 2-morpholino-4-chloro-dihydrothieno-[3,4-d]-pyrimidine and methyl-ethanolamine. Recrystallized from ethanol the product had a melting point of 165–167° C. The yield was 51% of theory.

(o) *2-morpholino-4-(β-hydroxyethyl - n - butylamino)-dihydrothiene-[3,4-d]-pyrimidine* of the formula

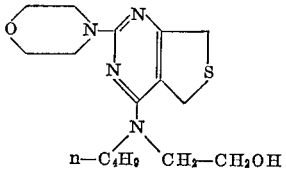

from 2-morpholino - 4 - chloro-dihydrothieno-(3,4-d)-pyrimidine and n-buty-ethanolamine. Recrystallized from a mixture of ethyl acetate and petroleum ether, the product had a melting point of 108–110° C. The yield was 38% of theory.

(p) *2-(2'-methyl-morpholino) - 4 - ethanolamino - dihydrothieno-[3,4-d]-pyrimidine* of the formula

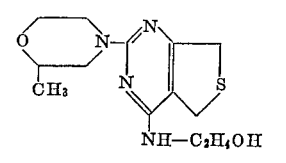

from 2-(2'-methyl-morpholino) - 4 - chloro-dihydrothieno-[3,4-d]-pyrimidine and ethanolamine. Recrystallized from acetone, the product had a melting point of 151–152° C. The yield was 37% of theory.

(q) *2-(2'-methyl-morpholino)-4 - diethanolamino -dihydrothieno-[3,4-d]-pyrimidine* of the formula

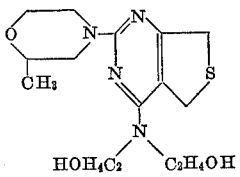

from 2-(2'-methyl-morpholino)-4-chloro - dihydrothieno-[3,4-d]-pyrimidine and diethanolamine. Recrystallized from acetone, the product had a melting point of 113–114° C. The yield was 42% of theory.

(r) *2-(2'-methyl-morpholino) - 4 - (ethyl - ethanolamino)dihydrothieno-[3,4-d]-pyrimidine* of the formula

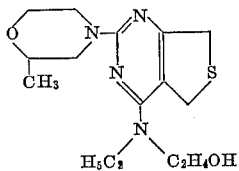

from 2-(2'-methyl-morpholino)-4-chloro - dihydrothieno-[3,4-d]-pyrimidine and ethyl-ethanolamine. Recrystallized from ethanol, the product had a melting point of 105-106° C. The yield was 44% of theory.

(s) *2 - pyrrolidino - 4 - ethanolamino - dihydrothieno-[3,4-d]-pyrimidine* of the formula

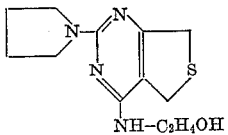

from 2-pyrrolidino-4-chloro-dihydrothieno - [3,4-d] - pyrimidine and ethanolamine. Recrystallized from methanol, the product had a melting point of 158–160° C. The yield was 45% of theory.

(t) *2-pyrrolidino - 4 - diethanolamino - dihydrothieno-[3,4-d]-pyrimidine* of the formula

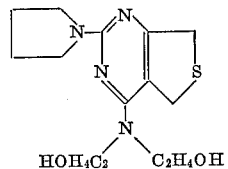

from 2-pyrrolidino-4-chloro-dihydrothieno - [3,4-d] - pyrimidine and diethanolamine. Recrystallized from methanol, the product had a melting point of 171° C. The yield was 29% of theory.

(u) *2-pyrrolidino-4-(methyl-ethanolamino) - diyhdrothieno-[3,4-d]-pyrimidine* of the formula

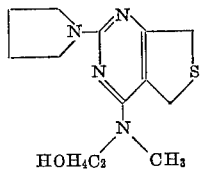

from 2 - pyrrolidino - 4 - chloro - dihydrothieno - [3,4-d]-pyrimidine and methyl-ethanolamine. Recrystallized from methanol, the product had a melting point of 159–160° C. The yield was 43% of theory.

(v) *2 - pyrrolidino-4-(n-butyl-ethanolamino)-dihydrothieno-[3,4-d]-pyrimidine* of the formula

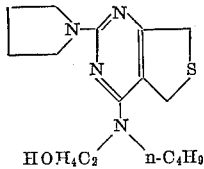

from 2 - pyrrolidino - 4 - chloro-dihydrothieno-[3,4-d]-pyrimidine and n - butyl - ethanolamine. Recrystallized from methanol, the product had a melting point of 141° C. The yield was 50% of theory.

(w) *2 - (N' - methyl - piperazino)-4-ethanolamino-dihydrothieno-[3,4-d]-pyrimidine* of the formula

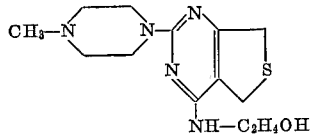

from 2 - (N' - methyl - piperazino)-4-chloro-dihydrothieno-[3,4-d]-pyrimidine and ethanolamine. Recrystallized from a mixture of ethanol and ether, the product had a melting point of 179–180° C. The yield was 48% of theory.

(x) *2 - (N' - methyl - piperazino)-4-diethanolamino-dihydrothieno-[3,4-d]pyrimidine* of the formula

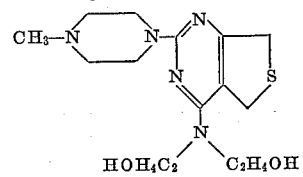

from 2 - (N' - methyl - piperazino)-4-chloro-dihydrothieno-[3,4-d]-pyrimidine and diethanolamine. Recrystallized from ethylacetate, the product had a melting point of 144–145° C. The yield was 41% of theory.

(y) *2 - (N' - methyl - piperazino)-4-(ethyl-ethanolamino)-dihydrothieno-[3,4-d]-pyrimidine* of the formula

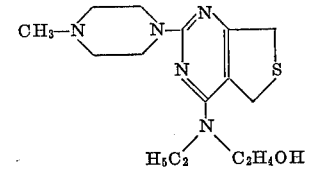

from 2 - (N' - methyl - piperazino)-4-chloro-dihydrothieno-[3,4-d]-pyrimidine and ethyl-ethanolamine. Recrystallized from ethyl acetate, the product had a melting point of 115° C. The yield was 31% of theory.

(z) *2 - dimethylamino - 4 - (methyl-ethanolamino)-dihydrothieno-[3,4-d]-pyrimidine* of the formula

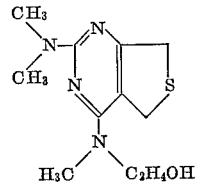

from 2 - dimethylamino - 4 - chloro - dihydrothieno-[3,4-d]-pyrimidine and methyl-ethanolamine. Recrystallized from ethanol, the product had a melting point of 124–126° C. The yield was 32% of theory.

(aa) *2 - dimethylamino - 4 - (ethyl - ethanolamino)-dihydrothieno-[3,4-d]-pyrimidine* of the formula

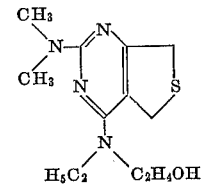

from 2 - dimethylamino - 4 - chloro - dihydrothieno-[3,4-d]-pyrimidine and ethyl-ethanolamine. Recrystallized from ethanol, the product had a melting point of 102–103° C. The yield was 43% of theory.

(bb) *2 - dimethylamino - 4 - (n - butyl - ethanolamino)-dihydrothieno-[3,4-d]-pyrimidine* of the formula

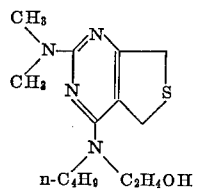

from 2 - dimethylamino - 4 - chloro - dihydrothieno - [3,4-d]-pyrimidine and n-butyl-ethanolamine. Recrystallized from ethyl acetate, the product had a melting point of 104° C. The yield was 38% of theory.

(cc) *2 - morpholino - 4 - (γ - methoxy - n - propylamino)-dihydrothieno-[3,4-d]-pyrimidine* of the formula

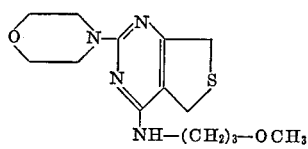

from 2 - morpholino - 4 - chloro - dihydrothieno - [3,4-d]-pyrimidine and γ-methoxy-n-propylamine. Recrystallized from methanol, the product had a melting point of 120–121° C. The yield was 37% of theory.

(dd) *2 - morpholino - 4 - (2' - methyl - morpholino)-5-methyl-dihydrothieno-[3,4-d]-pyrimidine* of the formula

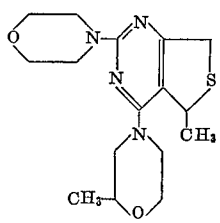

from 2 - morpholino 4 chloro - 5 - methyl - dihydrothieno-[3,4-d]-pyrimidine and 2-methyl-morpholine. Recrystallized from ethanol, the product had a melting point of 133° C. The yield was 64% of theory.

(ee) *2 - morpholino - 4 - pyrrolidino - 5 - methyl - dihydrothieno-[3,4-d]-pyrimidine* of the formula

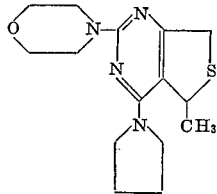

from 2 - morpholino - 4 - chloro - 5 - methyl - dihydrothieno-[3,4-d]-pyrimidine and pyrrolidine. Recrystallized from ethanol, the product had a melting point of 140–141° C. The yield was 83% of theory.

(ff) *2,4 - dimorpholino - 5 - n - propyl - dihydrothieno-[3,4-d]-pyrimidine* of the formula

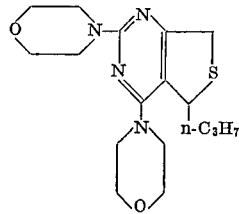

from 2 - morpholino - 4 - chloro - 5 - n - propyl - dihydrothieno-[3,4-d]-pyrimidine and morpholine. Recrystallized from petroleum ether, the product had a melting point of 111–112° C. The yield was 57% of theory.

(gg) *2 - morpholino - 4 - (2' - methyl - morpholino)-5-n-propyl-dihydrothieno-[3,4-d]-pyrimidine* of the formula

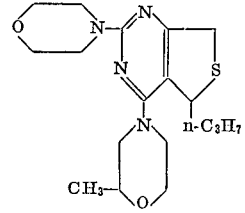

from 2 - morpholino - 4 - chloro - 5 - n - propyl - dihydrothieno-[3,4-d]-pyrimidine and 2-methyl-morpholine. Recrystallized from petroleum ether, the product had a melting point of 141—142° C. The yield was 75% of theory.

(hh) *2,4 - dimorpholino - 7 - methyl - dihydrothieno-[3,4-d]-pyrimidine* of the formula

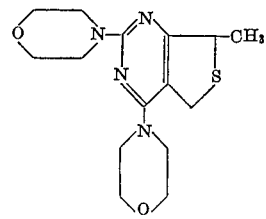

from 2-morpholino - 4 - chloro - 7 - methyl - dihydrothieno-[3,4-d]-pyrimidine and morpholine. Recrystallized from ethylene glycol, the product had a melting point of 180–182° C. The yield was 53% of theory.

(ii) *2 - pyrrolidino - 4 - morpholino - 7 - methyl - dihydrothieno-[3,4-d]-pyrimidine* of the formula

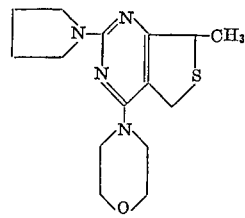

from 2-pyrrolidino - 4 - chloro - 7 - methyl - dihydrothieno - [3,4-d] - pyrimidine and morpholine. Recrystallized from a mixture of ethanol and dimethylformamide, the product had a melting point of 164–165° C. The yield was 44% of theory.

(jj) *2 - pyrrolidino - 4 - (2' - methyl - morpholino)-7-methyldihydrothieno-[3,4-d]-pyrimidine* of the formula

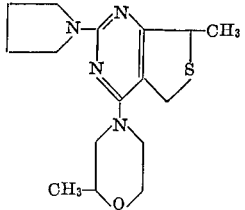

from 2 - pyrrolidino - 4 - chloro - 7 - methyl - dihydrothieno-[3,4-d]-pyrimidine and 2-methyl-morpholine. Recrystallized from ethanol, the product had a melting point of 111–112° C. The yield was 44% of theory.

(kk) *2 - (N' - methyl - piperazino) - 4 - piperidino-5-methyldihydrothieno-[3,4-d]-pyrimidine* of the formula

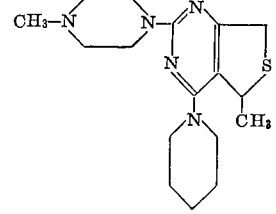

from 2 - (N' - methyl - piperazino) - 4 - chloro - 7-methyl-dihydrothieno-[3,4-d]-pyrimidine and piperidine. Recrystallized from ethanol, the product had a melting point of 134–135° C. The yield was 40% of theory.

(ll) *2 - dimethylamino - 4 - morpholino - 5 - methyl-dihydrothieno-[3,4-d]-pyrimidine* of the formula

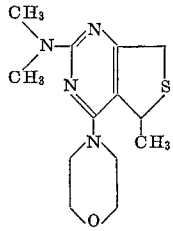

from 2 - dimethylamino - 4 - chloro - 5 - methyl - dihydrothieno-[3,4-d]-pyrimidine and morpholine. Recrystallized from methanol, the product had a melting point of 80–81° C. The yield was 20% of theory.

(mm) *2 - dimethylamino - 4 - (N' - methyl - piperazino) - 5 - methyl - dihydrothieno-[3,4-d]-pyrimidine* of the formula

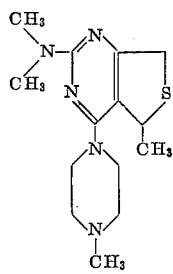

from 2 - dimethylamino - 4 - chloro - 5 - methyl - dihydrothieno - [3,4-d] - pyrimidine and N - methyl - piperazine. Recrystallized from petroleum ether, the product had a melting point of 96–97° C. The yield was 39% of theory.

(nn) *2 - dimethylamino - 4 - morpholino - 5 - n-propyl-dihydrothieno-[3,4-d]-pyrimidine* of the formula

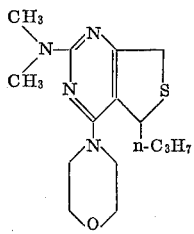

from 2 - dimethylamino - 4 - chloro - 5 - n - propyl-dihydrothieno-[3,4-d]-pyrimidine and morpholine. Recrystallized from hexane, the product had a melting point of 69–70° C. The yield was 45% of theory.

(oo) *2 - morpholino - 4 - cyclohexylamino - 5 - methyl-dihydrothieno-[3,4-d]-pyrimidine* of the formula

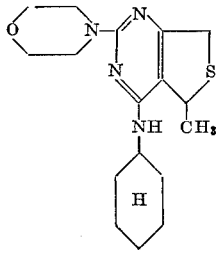

from 2 - morpholino - 4 - chloro - 5 - methyl - dihydrothieno-[3,4-d-]-pyrimidine and cyclohexylamine. Recrystallized from petroleum ether, the product had a melting point of 103–104° C. The yield was 85% of theory.

(pp) *2 - morpholino - 4 - anilino - 5 - methyl - dihydrothieno-[3,4-d]-pyrimidine* of the formula

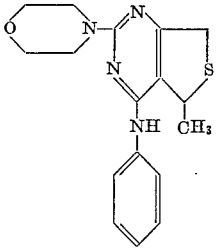

from 2 - morpholino - 4 - chloro - 5 - methyl - dihydrothieno-[3,4-d]-pyrimidine and aniline. Recrystallized from ethanol, the product had a melting point of 193–194° C. The yield was 66% of theory.

(qq) *2 - dimethylamino - 4 - cyclohexylamino - 5-methyl - dihydrothieno - [3,4 - d] - pyrimidine* of the formula

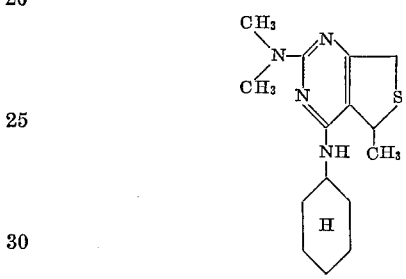

from 2 - dimethylamino - 4 - chloro - 5 - methyl - dihydrothieno - [3,4-d] - pyrimidine and cyclohexylamine. Recrystallized from petroleum ether, the product had a melting point of 117–118° C. The yield was 43% of theory.

(rr) *2 - dimethylamino - 4 - anilino - 5 - methyl - dihydrothieno-[3,4-d]-pyrimidine* of the formula

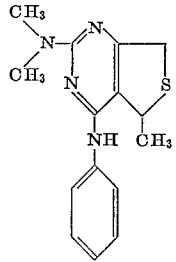

from 2 - dimethylamino - 4 - chloro - 5 - methyl - dihydrothieno-[3,4-d]-pyrimidine and aniline. Recrystallized from gasoline, the product had a melting point of 144–145° C. The yield was 44% of theory.

(ss) *2 - morpholino - 4 - allylamino - 5 - methyl-dihydrothieno-[3,4-d]-pyrimidine* of the formula

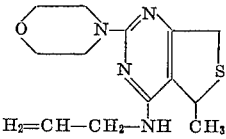

from 2 - morpholino - 4 - chloro - 5 - methyl - dihydrothieno-[3,4-d]-pyrimidine and allylamine. Recrystallized from ethanol, the product had a melting point of 112–113° C. The yield was 69% of theory.

(tt) *2-pyrrolidino-4-allylamino-dihydrothieno-[3,4-d]-pyrimidine* of the formula

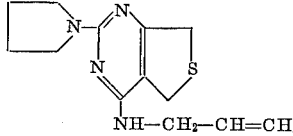

from 2-pyrrolidino-4-chloro-dihydrothieno-[3,4-d]-pyrimidine and allylamine. Recrystallized from petroleum ether, the product had a melting point of 138–139° C. The yield was 33% of theory.

(uu) *2-(N'-methyl-piperazino)-4-n-butylamino - dihydrothieno-[3,4-d]-pyrimidine* of the formula

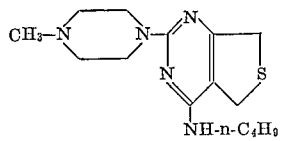

from 2-(N'-methyl-piperazino)-4 - chloro - dihydrothieno-[3,4-d] - pyrimidine and n - butylamine. Recrystallized from petroleum ether, the product had a melting point of 112–113° C. The yield was 52% of theory.

(vv) *2-(N'-methyl-piperazino)-4-isobutylamino - dihydrothieno-[3,4-d]-pyrimidine* of the formula

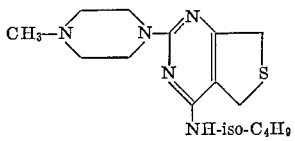

from 2-(N'-methyl-piperazino)-4 - chloro - dihydrothieno-[3,4-d]-pyrimidine and isobutylamine. Recrystallized from petroleum ether, the product had a melting point of 130–131° C. The yield was 70% of theory.

(ww) *2-(N'-methyl-piperazino)-4 - isoamylaminodihydrothieno-[3,4-d]-pyrimidine* of the formula

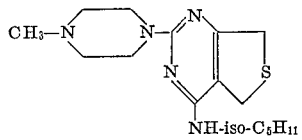

from 2-(N'-methyl-piperazino)-4 - chloro - dihydrothieno-[3,4-d]-pyrimidine and isoamylamine. Recrystallized from petroleum ether, the product had a melting point of 85–87° C. The yield was 42% of theory.

(xx) *2-(N'-methyl-piperazino)-4-allylamino - dihydrothieno-[3,4-d]-pyrimidine* of the formula

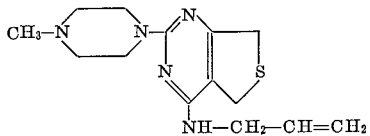

from 2-(N'-methyl-piperazino)-4 - chloro - dihydrothieno-[3,4-d]-pyrimidine and allylamine. Recrystallized from petroleum ether, the product had a melting point of 109–110° C. The yield was 48% of theory.

(yy) *2-morpholino-4-ethanolamino-5-methyl - dihydrothieno-[3,4-d]-pyrimidine* of the formula

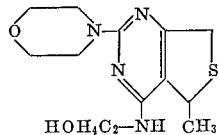

from 2-morpholino - 4 - chloro-5 - methyl - dihydrothieno-[3,4-d] - pyrimidine and ethanolamine. Recrystallized from water, the product had a melting point of 78° C. The yield was 69% of theory.

(zz) *2-pyrrolidino-4-(γ-dimethylamino-n - propylaminodihydrothieno-[3,4-d]-pyrimidine* of the formula

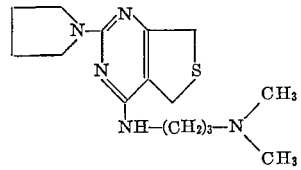

from 2-pyrrolidino-4-chloro-dihydrothieno-[3,4-d]-pyrimidine and N,N-dimethyl-propylenediamine. Recrystallized from gasoline, the product had a melting point of 84–85° C. The yield was 37% of theory.

(aaa) *2-(N'-methyl-piperazino)-4-(γ - dimethylamino-n-propylamino)-dihydrothieno-[3,4-d]-pyrimidine* of the formula

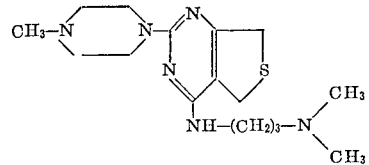

from 2-(N'-methyl-piperazino)-4 - chloro - dihydrothieno-[3,4-d]-pyrimidine and N,N-dimethyl-propylenediamine. Recrystallized from petroleum ether, the product had a melting point of 95–96° C. The yield was 39% of theory.

EXAMPLE 9

*Preparation of 2 - morpholino - 4-[(2-phenyl-1-methyl)-ethylamino]-dihydrothieno-[3,4-d]-pyrimidine by method B*

A mixture of 5.14 gm. (0.02 mol) of 2-morpholino-4-chloro-dihydrothieno-[3,4-d]-pyrimidine and 30 cc. of 2-amino-1-phenyl-propane was heated for 2½ hours on an oil bath at 150° C. (bath temperature). After allowing the clear reaction solution to cool, it was admixed with aqueous methanol while cooling to −10° C., and the walls of the container were scratched with a glass rod. The precipitate formed thereby was separated by vacuum filtration and was washed with a small amount of ice-cold methanol. 3.5 gm. (49% of theory) of a white crystalline substance were obtained, which was identified to be 2-morpholino - 4 - [(2-phenyl-1-methyl)-ethylamino]-dihydrothieno-[3,4-d]-pyrimidine of the formula

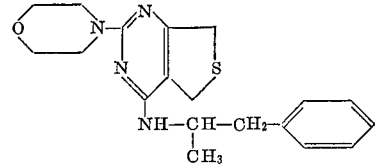

After recrystallization from ethanol, the product had a melting point of 130–132° C.

*Analysis:* $C_{19}H_{24}N_4OS$; molecular weight=356.50. Calculated: C, 64.01%; H, 6.79%; N, 15.72%. Found: C, 64.20%; H, 6.92%; N, 15.84%.

Using a procedure analogous to that described above, the following additional 2,4-diamino-substituted dihydrothieno-[3,4-d]-pyrimidines were prepared:

(a) *2 - (N' - methyl-piperazino)-4-(2'-methyl-morpholino)dihydrothieno-[3,4-d]-pyrimidine* of the formula

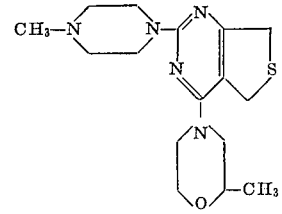

from 2 - (N'-methyl-piperazino)-4-chloro-dihydrothieno-[3,4-d]-pyrimidine and 2-methyl-morpholine. Recrystallized from ethyl acetate, the product had a melting point of 141–142° C. The yield was 48% of theory.

(b) *2 - morpholino - 4-(β-phenyl-ethylamino)-dihydrothieno-[3,4-d]-pyrimidine* of the formula

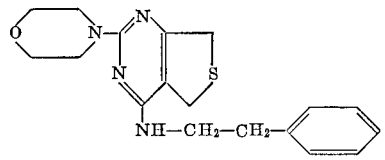

from 2 - morpholino-4-chloro-dihydrothieno-[3,4-d]-pyrimidine and β-phenyl-ethylamine. Recrystallized from methanol, the product had a melting point of 117–118° C. The yield was 79% of theory.

(c) 2 - morpholino - 4-[(α-methyl-β-phenyl)-ethylamino]-dihydrothieno-[3,4-d]-pyrimidine of the formula

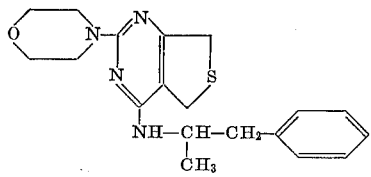

from 2 - morpholino - 4-chloro-dihydrothieno-[3,4-d]-pyrimidine and (α-methyl-β-phenyl)-ethylamine. Recrystallized from ethanol, the product had a melting point of 130–132° C. The yield was 62% of theory.

(d) 2 - morpholino - 4-[(α-methyl-γ-phenyl)-n-propylamino]-dihydrothieno-[3,4-d]-pyrimidine of the formula

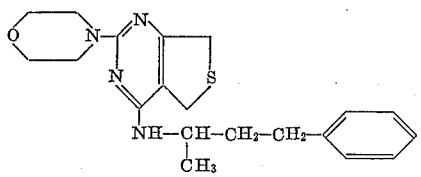

from 2-morpholino-4-chloro-dihydrothieno-[3,4-d]-pyrimidine and (α-methyl-γ-phenyl)-n-propylamine. Recrystallized from ethanol, the product had a melting point of 134–135° C. The yield was 42% of theory.

(e) 2-morpholino-4-(methyl - benzylamino) - dihydrothieno-[3,4-d]-pyrimidine of the formula

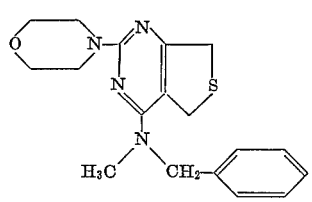

from 2-morpholino-4-chloro-dihydrothieno-[3,4-d]-pyrimidine and methyl-benzylamine. Recrystallized from methanol, the product had a melting point of 113–115° C. The yield was 59% of theory.

(f) 2-morpholino-4 - (γ - dimethylamino - n - propylamino)-dihydrothieno-[3,4-d]-pyrimidine of the formula

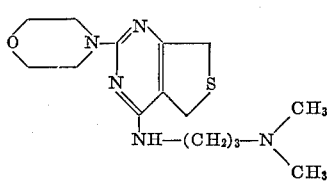

from 2-morpholino-4-chloro-dihydrothieno-[3,4-d]-pyrimidine and N,N-dimethyl-propylene diamine. Recrystallized from a mixture of water and methanol, the product had a melting point of 88–90° C. The yield was 41% of theory.

(g) 2-morpholino-4-benzylamino-5 - methyl - dihydrothieno-[3,4-d]-pyrimidine of the formula

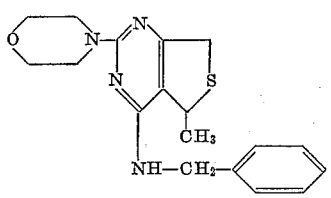

from 2-morpholino-4-chloro-5-methyl-dihydrothieno - [3,4-d]-pyrimidine and benzylamine. Recrystallized from 80% ethanol, the product had a melting point of 148–149° C. The yield was 82% of theory.

(h) 2-morpholino-4-(methyl-ethanolamino) - 5 - methyl-di-hydrothieno-[3,4-d]-pyrimidine of the formula

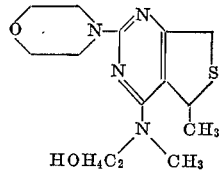

from 2-morpholino-4-chloro-5-methyl-dihydrothieno - [3,4-d]-pyrimidine and methyl-ethanolamine. Recrystallized from a mixture of ethanol and water, the product had a melting point of 95–96° C. The yield was 35% of theory.

(i) 2-(N'-methyl-piperazino) - 4 - (methyl - ethanolamino)-dihydrothieno-[3,4-d]-pyrimidine of the formula

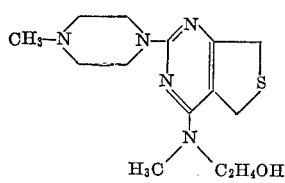

from 2-(N'-methyl-piperazino)-4-chloro-dihydrothieno-[3,4-d]-pyrimidine and methyl-ethanolamine. Recrystallized from methanol, the product had a melting point of 145–146° C. The yield was 41% of theory.

(j) 2-(N'-methyl-piperazino) - 4 - (n - butyl - ethanolamino)-dihydrothieno-[3,4-d]-pyrimidine of the formula

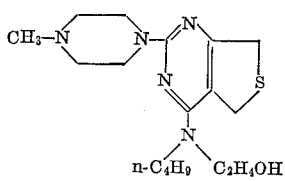

from 2-(N'-methyl-piperazino)-4-chloro-dihydrothieno-[3,4-d]-pyrimidine and n-butyl-ethanolamine. Recrystallized from ethylacetate the product had a melting point of 88–89° C. The yield was 40% of theory.

EXAMPLE 10

*Preparation of 2-morpholino-4-amino-dihydrothieno-[3,4-d]-pyrimidine by method B*

A mixture of 5.14 gm. (0.02 mol) of 2-morpholino-4-chloro-dihydrothieno-[3,4-d]-pyrimidine and 60 cc. of concentrated ammonia was heated on an oil bath in an autoclave for five hours at 120° C. (bath temperature). The contents of the vessel were then allowed to cool to room temperature, the excess ammonia was distilled off, the crystalline residue was thoroughly stirred with water, and the mixture was vacuum filtered. 3.0 gm. (62% of theory) of a white crystalline substance were obtained, which was identified to be 2-morpholino-4-amino-dihydrothieno-[3,4-d]-pyrimidine of the formula

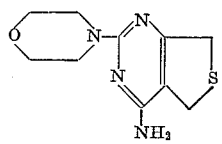

After recrystallization from ethanol the product had a melting point of 173–174° C.

*Analysis:* $C_{10}H_{14}N_4OS$; molecular weight=238.32. Calculated: C, 50.40%; H, 5.92%; N, 23.51%. Found: C, 50.30%; H, 6,05; N, 23.39.

Using a procedure analogous to that described above, the following additional 2,4-diamino-dihydrothieno-[3,4-d]-pyrimidines were prepared:

(a) *2-dimethylamino-4 - isopropylamino - 7 - methyl-dihydrothieno-[3,4-d]pyrimidine* of the formula

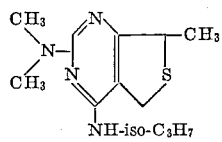

from 2-dimethylamino-4-chloro-7-methyl-dihydrothieno-[3,4-d]-pyrimidine and isopropylamine. Recrystallized from hexane, the product had a melting point of 71–72° C. The yield was 42% of theory.

(b) *2 - morpholino - 4 - methylamino - dihydrothieno-[3,4-d]-pyrimidine* of the formula

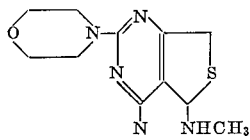

from 2-morpholino-4-chloro-dihydrothieno-[3,4 - d] - pyrimidine and methylamine. Recrystallized from ethanol, the product had a melting point of 199–201° C. The yield was 54% of theory.

(c) *2-morpholino - 4 - isopropylamino - dihydrothieno-[3,4-d]-pyrimidine* of the formula

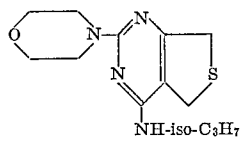

from 2-morpholino-4- chloro-dihydrothieno-[3,4 - d] - pyrimidine and isopropylamine. Recrystallized from ethanol, the product had a melting point of 189–190° C. The yield was 74% of theory.

(d) *2-morpholino - 4 - dimethylamino - dihydrothieno-[3,4-d]-pyrimidine* of the formula

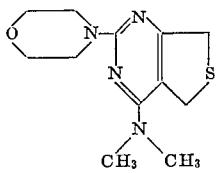

from 2-morpholino-4-chloro - dihydrothieno - [3,4 - d]-pyrimidine and dimethylamine. Recrystallized from ethanol, the product had a melting point of 161–163° C. The yield was 51% of theory.

(e) *2 - morpholino-4-diethylamino-dihydrothieno-[3,4-d]-pyrimidine* of the formula

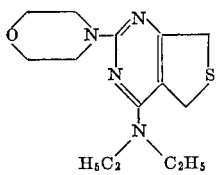

from 2-morpholino - 4 - chloro-dihydrothieno-[3,4-d]-pyrimidine and diethylamine. Recrystallized from ethanol, the product had a melting point of 127–129° C. The yield was 52% of theory.

(f) *2 - (2'-methyl-morpholino)-4-amino-dihydrothieno-[3,4-d]-pyrimidine* of the formula

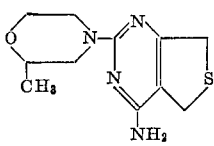

from 2 - (2'-methyl-morpholino)-4-chloro-dihydrothieno-[3,4-d]-pyrimidine and ammonia. Recrystallized from ethanol, the product had a melting point of 168–169° C. The yield was 64% of theory.

(g) *2-(2'-methyl-morpholino) - 4 - isopropylamino-dihydrothieno-[3,4-d]-pyrimidine* of the formula

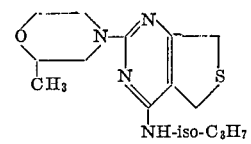

from 2 - (2'-methyl-morpholino)-4-chloro-dihydrothieno-[3,4-d]-pyrimidine and isopropylamine. Recrystallized from methanol, the product had a melting point of 146–147° C. The yield was 47% of theory.

(h) *2-(2'-methyl-morpholino)-4-diethylamino-dihydrothieno-[3,4-d]-pyrimidine* of the formula

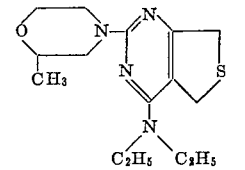

from 2 - (2'-methyl-morpholino)-4-chloro-dihydrothieno-[3,4-d]-pyrimidine and diethylamine. Recrystallized from 70% ethanol, the product had a melting point of 94–96° C. The yield was 36% of theory.

(i) *2 - piperidino-4-isopropylamino-dihydrothieno-[3,4-d]-pyrimidine* of the formula

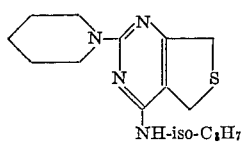

from 2-piperidino-4-chloro-dihydrothieno-[3,4-d]-pyrimidine and isopropylamine. Recrystallized from ether, the product had a melting point of 112–113° C. The yield was 51% of theory.

(j) *2-pyrrolidino-4-diethylamino - dihydrothieno - [3,4-d]-pyrimidine* of the formula

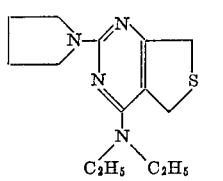

from 2-pyrrolidino-4-chloro-dihydrothieno-[3,4-d]-pyrimidine and diethylamine. Recrystallized from a mixture of ethanol and water, the product had a melting point of 75–76° C. The yield was 52% of theory.

(k) *2-(N'-methyl-piperazino)-4 - methylamino - dihydrothieno-[3,4-d]-pyrimidine* of the formula

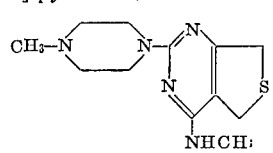

from 2-(N'-methyl-piperazino)-4-chloro - dihydrothieno-[3,4-d]-pyrimidine and methylamine. Recrystallized from ether, the product had a melting point of 142–144° C. The yield was 40% of theory.

(l) *2-(N'-methyl-piperazino)-4 - isopropylamino - -dihydrothieno-[3,4-d]-pyrimidine* of the formula

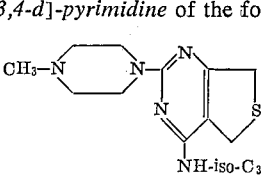

from 2-(N'-methyl-piperazino)-4-chloro - dihydrothieno-[3,4-d]-primidine and isopropylamine. Recrystallized from ether, the product had a melting point of 130–131° C. The yield was 69% of theory.

(m) 2-(N'-methyl-piperazino)-4 - dimethylamino - dihydrothieno-[3,4-d]-pyrimidine of the formula

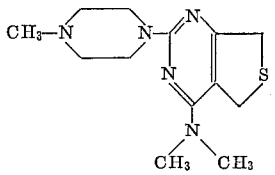

from 2-(N'-methyl-piperazino)-4-chloro - dihydrothieno-[3,4-d]-pyrimidine and dimethylamine. Recrystallized from ethanol, the product had a melting point of 143–144° C. The yield was 75% of theory.

(n) 2,4-bis-(methylamino) - dihydrothieno - [3,4-d]-pyrimidine of the formula

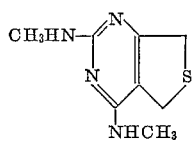

from 2-methylamino - 4 - chloro - dihydrothieno - [3,4-d]-pyrimidine and methylamine. Recrystallized from ethanol, the product had a melting point of 204–206° C. The yield was 47% of theory.

(o) 2-methylamino-4 - dimethylamino - dihydrothieno-[3,4-d]-pyrimidine of the formula

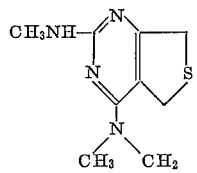

from 2-methylamino-4-chloro-dihydrothieno-[3,4-d] - pyrimidine and dimethylamine. Recrystallized from ethanol, the product had a melting point of 208–210° C. The yield was 63% of theory.

(p) 2-dimethylamino-4 - methylamino - dihydrothieno-[3,4-d]-pyrimidine of the formula

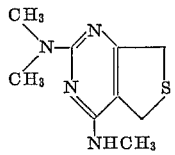

from 2-dimethylamino-4-chloro - dihydrothieno - [3,4-d]-pyrimidine and methylamine. Recrystallized from ethanol, the product had a melting point of 118–120° C. The yield was 48% of theory.

(q) 2-dimethylamino-4-isopropylamino-dihydrothieno-[3,4-d]-pyrimidine of the formula

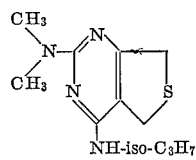

from 2-dimethylamino-4-chloro - dihydrothieno - [3,4-d]-pyrimidine and isopropylamine. Recrystallized from ether, the product had a melting point of 122–124° C. The yield was 45% of theory.

(r) 2,4-bis-(dimethylamino) - dihydrothieno - [3,4-d]-pyrimidine of the formula

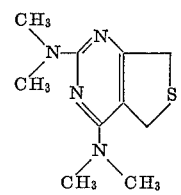

from 2-dimethylamino-4-chloro - dihydrothieno - [3,4-d]-pyrimidine and dimethylamine. Recrystallized from ethanol, the product had a melting point of 119–121° C. The yield was 47% of theory.

(s) 2-morpholino-4-ethylamino-dihydrothieno-[3,4-d]-pyrimidine of the formula

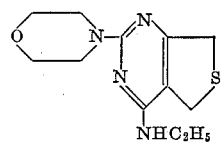

from 2-dimethylamino-4-chloro - dihydrothieno - [3,4-d]-pyrimidine and ethylamine. Recrystallized from 80% ethanol, the product had a melting point of 172–173° C The yield was 55% of theory.

(t) 2 - morpholino - 4 - amino - 5 - methyl - dihydrothieno-[3,4-d]-pyrimidine of the formula

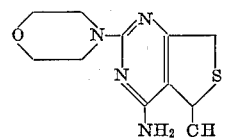

from 2 - morpholino - 4 - chloro - 5 - methyl - dihydrothieno-[3,4-d]-pyrimidine and ammonia. Recrystallized from ethanol, the product had a melting point of 174–175° C. The yield was 75% of theory.

(u) 2 - morpholino - 4 - methylamino - 5 - methyl - dihydrothieno-[3,4-d]-pyrimidine of the formula

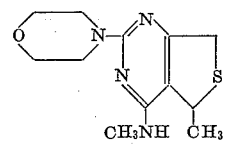

from 2 - morpholino - 4 - chloro - 5 - methyl - dihydrothieno-[3,4-d]-pyrimidine and methylamine. Recrystallized from ethanol, the product had a melting point of 204–205° C. The yield was 65% of theory.

(v) 2-morpholino - 4 - isopropylamino - 5 - methyl - dihydrothieno-[3,4-d]-pyrimidine of the formula

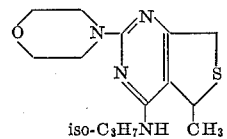

from 2 - morpholino - 4 - chloro - 5 - methyl - dihydrothieno-[3,4-d]-pyrimidine and isopropylamine. Recrystallized from ethanol, the product had a melting point of 145–146° C. The yield was 55% of theory.

(w) 2 - morpholino - 4 - isopropylamino - 7 - methyl-dihydrothieno-[3,4-d]-pyrimidine of the formula

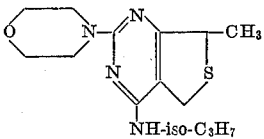

from 2 - morpholino - 4 - chloro - 7 - methyl - dihydrothieno-[3,4-d]-pyrimidine and isopropylamine. Recrystallized from ethanol, the product had a melting point of 165–166° C. The yield was 35% of theory.

(x) 2 - morpholino - 4 - dimethylamino - 5 - methyl-dihydrothieno[3,4-d]-pyrimidine of the formula

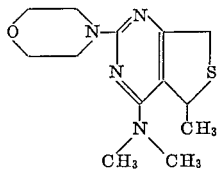

from 2 - morpholino - 4 - chloro - 5 - methyl - dihydro-thieno-[3,4-d]-pyrimidine and dimethylamine. Recrystallized from ethanol, the product had a melting point of 109–110° C. The yield was 58% of theory.

(y) 2 - pyrrolidino - 4 - isopropylamino - dihydrothi-eno-[3,4-d]-pyrimidine of the formula

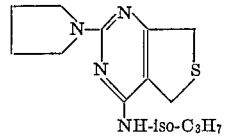

from 2 - pyrrolidino - 4 - chloro - dihydrothieno - [3,4-d]-pyrimidine and isopropylamine. Recrystallized from ethanol, the product had a melting point of 153–155° C. The yield was 49% of theory.

(z) 2 - pyrrolidino - 4 - ethylamino-7-methyl-dihydro-thieno-[3,4-d]-pyrimidine of the formula

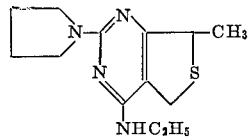

from 2 - pyrrolidino - 4 - chloro-7-methyl-dihydrothieno-[3,4-d]-pyrimidine and ethylamine. Recrystallized from methanol, the product had a melting point of 129–130° C. The yield was 46% of theory.

(aa) 2 - pyrrolidino - 4 - n - propylamino-7-methyl-di-hydrothieno-[3,4-d]-pyrimidine of the formula

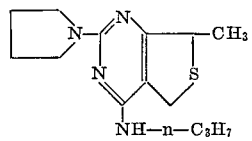

from 2 - pyrrolidino - 4 - chloro-7-methyl-dihydrothieno-[3,4-d]-pyrimidine and n-propylamine. Recrystallized from methanol, the product had a melting point of 122–123° C. The yield was 74% of theory.

(bb) 2 - pyrrolidino - 4 - isopropylamino-7-methyl-di-hydrothieno-[3,4-d]-pyrimidine of the formula

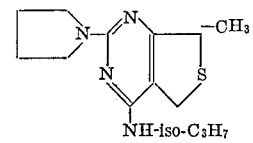

from 2 - pyrrolidino - 4 - chloro-7-methyl-dihydrothieno-[3,4-d]-pyrimidine and isopropylamine. Recrystallized from a mixture of methanol and water, the product had a melting point of 110–111° C. The yield was 35% of theory.

(cc) 2-(N'-methyl-piperazino)-4-amino-dihydrothieno-[3,4-d]-pyrimidine of the formula

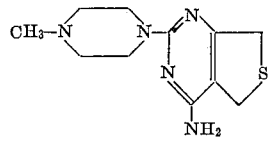

from 2 - (N'-methyl-piperazino)-4-chloro-dihydrothieno-[3,4-d]-pyrimidine and ammonia. Recrystallized from ethanol, the product had a melting point of 159–160° C. The yield was 58% of theory.

(dd) 2-(N'-methyl-piperazino)-4-ethylamino-dihydro-thieno-[3,4-d]-pyrimidine of the formula

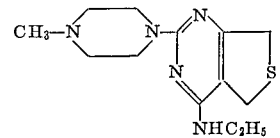

from 2 - (N'-methyl-piperazino)-4-chloro-dihydrothieno-[3,4-d]-pyrimidine and ethylamine. Recrystallized from cyclohexane, the product had a melting point of 133–134° C. The yield was 39% of theory.

(ee) 2 - (N' - methyl-piperazino) - 4-n-propylamino-5-methyl-dihydrothieno-[3,4-d]-pyrimidine of the formula

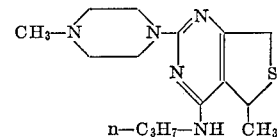

from 2-(N' - methyl-piperazino)-4-chloro-5-methyl-dihy-drothieno-[3,4-d]-pyrimidine and n-propylamine. Recrystallized from gasoline, the product had a melting point of 78–79° C. The yield was 24% of theory.

(ff) 2 - dimethylamino-4-methylamino-5-methyl - dihy-drothieno-[3,4-d]-pyrimidine of the formula

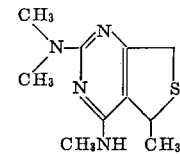

from 2-dimethylamino-4-chloro-5-methyl - dihydrothieno-[3,4 - d] - pyrimidine and methylamine. Recrystallized from petroleum ether, the product had a melting point of 111–112° C. The yield was 30% of theory.

(gg) 2,4-bis-(dimethylamino)-5-methyl-dihydrothieno-[3,4-d]-pyrimidine of the formula

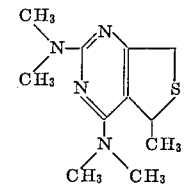

from 2-dimethylamino - 4 - chloro - 5 - methyl - dihydro-thieno-[3,4-d]-pyrimidine and dimethylamine. Recrystallized from petroleum ether, the product had a melting point of 81–82° C. The yield was 49% of theory.

(hh) 2 - dimethylamino - 4 - amino - 7 - methyl-dihy-drothieno-[3,4-d]-pyrimidine of the formula

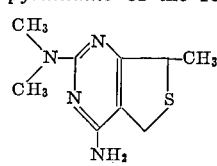

from 2-dimethylamino - 4 - chloro - 7 - methyl - dihydro-thieno-[3,4-d]-pyrimidine and ammonia. Recrystallized from ethanol, the product had a melting point of 135–136° C. The yield was 65% of theory.

(ii) 2 - pyrrolidino - 4 - amino-dihydrothieno-[3,4-d]-pyrimidine of the formula

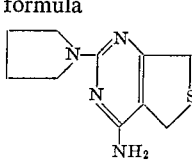

from 2 - pyrrolidino - 4 - chloro - dihydrothieno-[3,4-d]-pyrimidine and ammonia. Recrystallized from ethyl acetate, the product had a melting point of 198–200° C. The yield was 81% of theory.

EXAMPLE 11

*Preparation of the hydrochloric acid addition salt of 2-(N'-methyl - piperazino) - 4 - morpholino - dihydro-thieno-[3,4-d]-pyrimidine*

A solution of 1.6 gm. (0.005 mol) of 2-(N'-methyl-piperazino) - 4 - morpholino - dihydrothieno - [3,4-d]-pyrimidine in 50 cc. of absolute ethylacetate was admixed with ethereal hydrochloric acid until the solution was acid to Congo red. The precipitate formed thereby was separated by vacuum filtration and was washed with a small amount of absolute etheylacetate. 1.4 gm. (78% of theory) of 2-(N'-methyl - piperazino) - 4 - morpholino - dihydrothieno - [3,4-d]-pyrimidine hydrochloride were obtained in the form of a white crystalline substance. After recrystallization from absolute ethanol, the salt had a melting point of 269° C.

*Analysis.*—$C_{15}H_{24}ClN_5OS$; molecular weight=357.93. Calculated: C, 50.34%; H, 6.76%; Cl, 9.91%. Found: C, 50.10%; H, 6.89%; Cl, 9.74%.

In analogous fashion the following additional 2,4,5-trisubstituted dihydrothieno - [3,4-d] - pyrimidine hydrochlorides were prepared from the corresponding free base.

(a) *2 - morpholino - 4 - isobutylamino - 5 - n-propyl-dihydrothieno-[3,4-d] - pyrimidine hydrochloride.* Recrystallized from ethanol, the salt had a melting point of 220–221° C. Yield: 35% of theory.

(b) *2-(N' - methyl-piperazino) - 4 - isopropylamino - 5-methyl-dihydrothieno - [3,4-d]-pyrimidine hydrochloride.* Recrystallized from ethyl acetate, the salt had a melting point of 218–220° C. Yield: 36% of theory.

(c) *2-(N'-methyl-piperazino)-4-isobutylamino-5-methyl-dihydrothieno-[3,4-d]-pyrimidine hydrochloride.* Recrystallized from isopropanol, the salt had a melting point of 259–260° C. Yield: 43% of theory.

(d) *2-(N'-methyl-piperazino)-4-n-butoxy-5-methyl-dihydrothieno-[3,4-d]-pyrimidine hydrochloride.* Recrystallized from isopropanol, the salt had a melting point of 240° C. Yield: 39% of theory.

(e) *2-Methyl-4-morpholino-5 - n-propyl-dihydrothieno-[3,4-d]-pyrimidine hydrochloride.* Recrystallization from gasoline, the salt had a melting of 179–180° C. Yield: 47% of theory.

EXAMPLE 12

*Preparation of 2-morpholino-4-hydrazino-dihydrothieno-[3,4-d]-pyrimidine by method B*

4.0 gm. (0.0155 mol) of 2-morpholino-4-chlorodihydrothieno-[3,4-d]-pyrimidine were dissolved in 300 cc. of absolute ethanol 30 cc. of 80% hydrazine hydrate were added to the solution, and the resulting mixture was refluxed for four hours. Upon cooling of the clear reaction solution, a crystalline precipitate formed which was filtered off and washed with ethanol. 2.2 gm. (56% of theory) of analytically pure 2-morpholino-4-hydrazino-dihydrothieno-[3,4-d]-pyrimidine of the formula

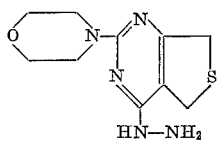

were obtained. It had a melting point of 218–220° C.

*Analysis.*—$C_{10}H_{15}N_5OS$; molecular weight = 253.34. Calculated: C, 47.41%; H, 5.97%; N, 27.65%. Found: C, 47.55; H, 6.12%; N 27.80%.

In analogous fashion the following additional 2-amino-4-hydrazine-dihydrothieno-[3,4-d]-pyrimidines were prepared:

(a) *2-pyrrolidino-4-hydrazino - dihydrothieno-[3,4-d]-pyrimidine* of the formula

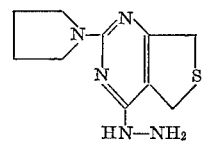

from 2-pyrrolidino-4-chloro - dihydrothieno - [3,4-d]-pyrimidine and hydrazine hydrate. The product had a melting point of 219–221° C.

(b) *2-morpholino-4 - phenylhydrazino - dihydrothieno-[3,4-d]-pyrimidine* of the formula

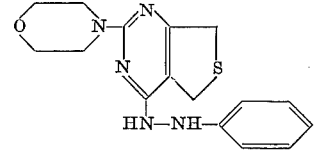

from 2-morpholino-4-chloro - dihydrothieno - [3,4-d]-pyrimidine and phenylhydrazine hydrate. The product had a melting point of 197–199° C. after recrystallization from ethanol.

(c) *2-(N'-methyl - piperazino) - 4 - hydrazino-dihydrothieno-[3,4-d]-pyrimidine* of the formula

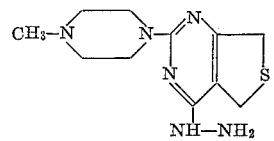

from 2-(N'-methyl - piperazino)-4-chloro-dihydrothieno-[3,4-d]-pyrimidine and hydrazine hydrate. The product had a melting point of 215–217° C. after recrystallization from ethanol.

EXAMPLE 13

*Preparation of 2-morpholino-4-ethoxy-dihydrothieno-[3,4-d]-pyrimidine by method B*

4.0 gm. (0.0155 mol) of 2-morpholino-4-chlorodihydrothieno-[3,4-d]-pyrimidine were added to a solution of 0.4 gm. (0.017 mol) of sodium in 100 cc. of absolute ethanol, and the resulting mixture was refluxed for three hours. Upon cooling of the reaction mixture a crystalline precipitate separated out, which was isolated by vacuum filtration and thoroughly washed with water. 2.8 gm. (68% of theory) of a white crystalline substance were obtained, which was identified to be 2-morpholino-4-ethoxy-dihydrothieno-[3,4-d]-pyrimidine of the formula

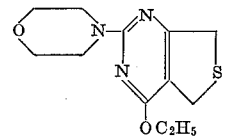

recrystallized from ethanol, the product had a melting point of 121° C.

*Analysis.*—$C_{12}H_{17}N_3O_2S$; molecular weight=267.36. Calculated: C, 53.91%; H, 6.41%; N, 15.72%. Found: C, 54.05%; H, 6.54%; N, 15.60%.

Using a procedure analogous to that described above, the following additional 2-amino-4-oxy-dihydrothieno-[3,4-d]-pyrimidines were prepared:

(a) *2 - morpholino - 4 - (ethoxy-ethoxy) - dihydrothieno - [3,4 - d] - pyridimine* of the formula

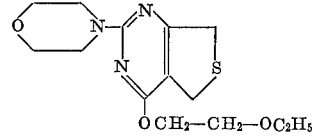

from 2 - morpholino - 4 - chloro - dihydrothieno - [3,4-d]-pyridimine and sodium ethoxy-ethylate. Recrystallized from ethanol, the product had a melting point of 98–99° C. The yield was 71% of theory.

(b) 2 - morpholino - 4 - (β - dimethylamino - ethoxy)-dihydrothieno-[3,4-d]-pyrimidine of the formula

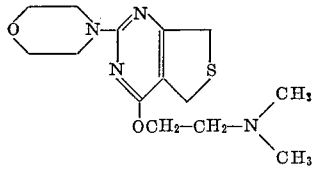

from 2 - morpholino - 4 - chloro - dihydrothieno - [3,4-d]-pyrimidine and sodium β-dimethylamino-ethylate. Recrystallized from methanol, the product had a melting point of 90–91° C. The yield was 63% of theory.

(c) 2 - (2' - methyl-morpholino) - 4 - ethoxy - dihydrothieno-[3,4-d]-pyrimidine of the formula

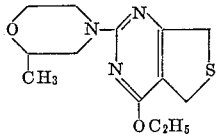

from 2 - (2' - methyl - morpholino) - 4 - chloro- dihydrothieno-[3,4-d]-pyrimidine and sodium ethylate. Recrystallized from acetone, the product had a melting point of 112–114° C. The yield was 57% of theory.

(d) 2 - pyrrolidino - 4 - methoxy - dihydrothieno - [3,4-d]-pyrimidine of the formula

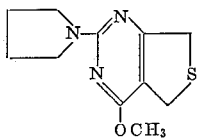

from 2 - pyrrolidino - 4 - chloro - dihydrothieno - [3,4-d]-pyrimidine and sodium methylate. Recrystallized from methanol, the product had a melting point of 130–132° C. The yield was 67% of theory.

(e) 2 - pyrrolidino - 4 - ethoxy - dihydrothieno - [3,4-d]-pyrimidine of the formula

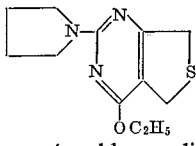

from 2 - pyrrolidino - 4 - chloro - dihydrothieno - [3,4-d]-pyrimidine and sodium ethylate. Recrystallized from ethanol, the product had a melting point of 109–111° C. The yield was 64% of theory.

(f) 2 - (N' - methyl - piperazino) - 4 - methoxy - dihydrothieno-[2,4-d]-pyrimidine of the formula

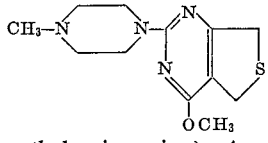

from 2 - (N' - methyl - piperazino) - 4 - chloro - dihydrothieno-[3,4-d]-pyrimidine and sodium methylate. Recrystallized from methanol, the product had a melting point of 115–116° C. The yield was 47% of theory.

(g) 2 - (N' - methyl - piperazino) - 4 - ethoxy - dihydrothieno-[3,4-d]-pyrimidine of the formula

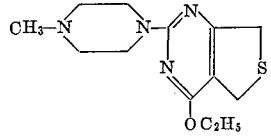

from 2 - (N' - methyl - piperazino) - 4 - chloro - dihydrothieno-[3,4-d]-pyrimidine and sodium ethylate. Recrystallized from ether, the product had a melting point of 90–92° C. The yield was 54% of theory.

(h) 2 - morpholino - 4-methoxy-dihydrothieno-[3,4-d]-pyrimidine of the formula

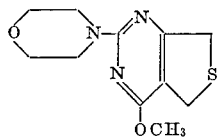

from 2-morpholino-4-chloro-dihydrothieno-[3,4-d]-pyrimidine and sodium methylate. Recrystallized from ethanol, the product had a melting point of 147–148° C. The yield was 56% of theory.

(i) 2 - morpholino-4-isopropoxy-dihydrothieno-[3,4-d]-pyrimidine of the formula

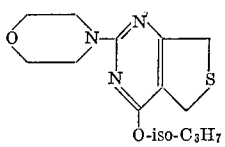

from 2-morpholino-4-chloro-dihydrothieno-[3,4-d]-pyrimidine and sodium isopropylate. Recrystallized from ethanol, the product had a melting point of 142–143° C. The yield was 73% of theory.

(j) 2 - morpholino-4-isobutoxy-dihydrothieno-[3,4-d]-pyrimidine of the formula

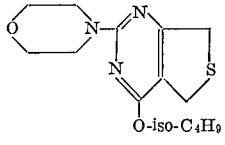

from 2-morpholino-4-chloro-dihydrothieno-[3,4-d]-pyrimidine and sodium isobutylate. Recrystallized from ethyl acetate, the product had a melting point of 77–78° C. The yield was 36% of theory.

(k) 2 - morpholino - 4-allyloxy-dihydrothieno-[3,4-d]-pyrimidine of the formula

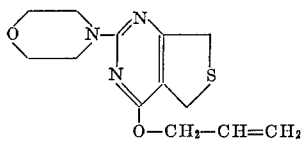

from 2-morpholino-4-chloro-dihydrothieno-[3,4-d]-pyrimidine and sodium allylate. Recrystallized from 90% ethanol, the product had a melting point of 107–108° C. The yield was 40% of theory.

(l) 2 - morpholino - 4-ethoxy-5-methyl-dihydrothieno-[3,4-d]-pyrimidine of the formula

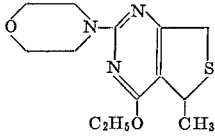

from 2-morpholino-4-chloro-5-methyl-dihydrothieno-[3,4-d]-pyrimidine and sodium ethylate. Recrystallized from ethanol, the product had a melting point of 118–119° C. The yield was 29% of theory.

(m) 2 - morpholino-4-isopropoxy-5-methyl-dihydrothieno-[3,4-d]-pyrimidine of the formula

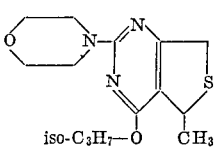

from 2-morpholino-4-chloro-5-methyl-dihydrothieno-[3,4-d]-pyrimidine and sodium isopropylate. Recrystallized from methanol, the product had a melting point of 117–118° C. The yield was 64% of theory.

(n) *2-morpholino-4-isopropoxy-7-methyl-dihydrothieno-[3,4-d]-pyrimidine* of the formula

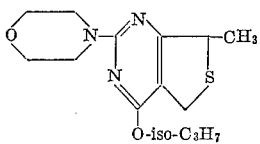

from 2-morpholino-4-chloro-7-methyl-dihydrothieno-[3,4-d]-pyrimidine and sodium isopropylate. Recrystallized from ethanol, the product had a melting point of 88–89° C. The yield was 58% of theory.

(o) *2-pyrrolidino - 4 - isopropoxy - dihydrothieno-[3,4-d]-pyrimidine* of the formula

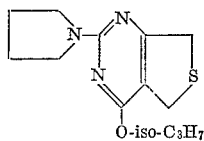

from 2-pyrrolidino-4-chloro-dihydrothieno-[3,4,-d]-pyrimidine and sodium isopropylate. Recrystallized from 90% ethanol, the product had a melting point of 85–86° C. The yield was 39% of theory.

(p) *2-pyrrolidino - 4 - isobutoxy-dihydrothieno-[3,4-d]-pyrimidine* of the formula

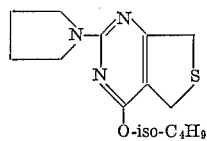

from 2-pyrrolidino-4-chloro-dihydrothieno-[3,4-d]-pyrimidine and sodium isobutylate. Recrystallized from ethyl acetate, the product had a melting point of 67–68° C. The yield was 36% of theory.

(q) *2-(N'-methyl - piperazino)-4-n-propoxy-dihydrothieno-[3,4-d]-pyrimidine* of the formula

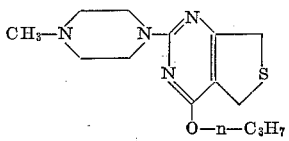

from 2-(N'-methyl-piperazino)-4-chloro-dihydrothieno-[3,4-d]-pyrimidine and sodium propylate. Recrystallized from petroleum ether, the product had a melting point of 83–84° C. The yield was 37% of theory.

(r) *2-(N'-methyl - piperazino)-4-allyloxy-dihydrothieno-[3,4-d]-pyrimidine* of the formula

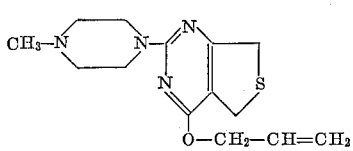

from 2-(N'-methyl-piperazino)-4-chloro - dihydrothieno-[3,4-d]-pyrimidine and sodium allylate. Recrystallized from petroleum ether, the product had a melting point of 87–88° C. The yield was 49% of theory.

(s) *2-(N'-methyl-piperazino)-4-ethoxy-5 - methyldihydrothieno-[3,4-d]-pyrimidine* of the formula

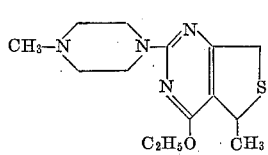

from 2-(N'-methyl-piperazino)-4-chloro-5-methyl - dihydrothieno[3,4-d]-pyrimidine and sodium ethylate. Recrystallized from 70% ethanol, the product had a melting point of 93–94° C. The yield was 39% of theory.

(t) *2 - pyrrolidino - 4 - ethoxy - 7 - methyl-dihydrothieno-[3,4-d]-pyrimidine* of the formula

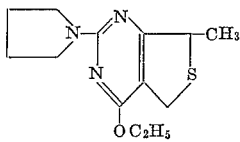

from 2-pyrrolidino - 4 - chloro - 7 - methyl-dihydrothieno-[3,4-d]-pyrimidine and sodium ethylate. Recrystallized from ethanol, the product had a melting point of 60–61° C. The yield was 51% of theory.

(u) *2 - dimethylamino - 4 - methoxy - 5 - methyl-dihydrothieno-[3,4-d]-pyrimidine* of the formula

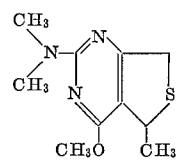

from 2-dimethylamino - 4 - chloro - 5 - methyl-dihydrothieno-[3,4-d]-pyrimidine and sodium methylate. Recrystallized from 80% ethanol, the product had a melting point of 79–80° C. The yield was 46% of theory.

(v) *2-dimethylamino - 4 - ethoxy - 7 - methyl-dihydrothieno-[3,4-d]-pyrimidine* of the formula

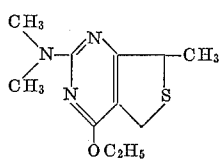

from 2-dimethylamino - 4 - chloro - 7 - methyl-dihydrothieno-[3,4-d]-pyrimidine and sodium ethylate. Recrystallized from ethanol, the product had a melting point of 49–50° C. The yield was 53% of theory.

(w) *2-(N'-methyl-piperazino) - 4 - n - butoxy-dihydrothieno-[3,4-d]-pyrimidine* of the formula

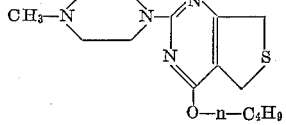

from 2 - (N' - methyl-piperazino) - 4 - chloro-dihydrothieno-[3,4-d]-pyrimidine and sodium butylate. Recrystallized from gasoline, the product had a melting point of 53–54° C. The yield was 61% of theory.

(x) *2-methylamino - 4 - ethoxy-dihydrothieno-[3,4-d]-pyrimidine* of the formula

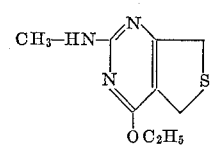

from 2-methylamino - 4 - chloro-dihydrothieno-[3,4-d]-pyrimidine and sodium ethylate. Recrystallized from ethanol, the product had a melting point of 140–141° C. The yield was 40% of theory.

(y) *2 - dimethylamino - 4 - ethoxy - dihydrothieno-[3,4-d]-pyrimidine* of the formula

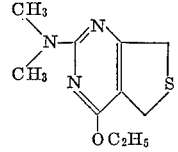

from 2-dimethylamino - 4 - chloro-dihydrothieno-[3,4-d]-

47 pyrimidine and sodium ethylate. Recrystallized from ethanol, the product had a melting point of 87–89° C. The yield was 56% of theory.

EXAMPLE 14

*Preparation of 2-morpholino-4-mercapto-dihydrothieno-[3,4-d]-pyrimidine by method B*

A mixture of 7.2 gm. (0.03 mol) of 2 - morpholino-4 - hydroxy - dihydrothieno - [3,4 - d] - pyrimidine, 6.7 gm. (0.033 mol) of phosphorus pentasulfide and 150 cc. of pyridine was heated for three hours on an oil bath at 120° C. (bath temperature). Thereafter, the hot reaction solution was poured into 150 cc. of water, the aqueous mixture was heated for two hours on a steam bath and was then concentrated by evaporation to a volume of about 50 cc. The yellow crystalline precipitate formed thereby was separated by vacuum filtration and washed several times with water. 6.0 gm. (78% of theory) of raw 2 - morpholino - 4 - mercapto - dihydrothieno-[3,4-d]-pyrimidine of the formula

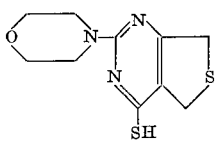

were obtained. After recrystallization from butanol, the product had a melting point of 207–209° C.

*Analysis:* $C_{10}H_{13}N_3OS_2$. Calculated: C, 47.03%; H, 5.13%; S, 25.11%. Found: C, 46.91%; H, 5.25%; S, 24.98%.

EXAMPLE 15

*Preparation of 2-morpholino-4-methylmercapto-dihydrothieno-[3,4-d]-pyrimidine by method B*

10 gm. (0.07 mol) of methyl iodide were added dropwise to a solution of 2.55 gm. (0.01 mol) of 2-morpholino-4 - mercapto - dihydrothieno - [3,4 - d] - pyrimidine in 40 cc. 2N - potassium - hydroxide at 5° C., while vigorously stirring the solution. A crystalline substance immediately precipitated out. The reaction solution was slowly heated to 50° C., vacuum filtered while still warm, and the crystalline filter cake was washed with water. 1.8 gm. (67% of theory) of raw 2 - morpholino - 4 - methylmercapto - dihydrothieno - [3,4 - d] - pyrimidine of the formula

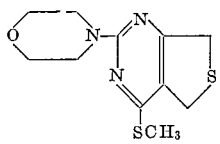

were obtained. After recrystallization from ethanol, the product had a melting point of 163–164° C.

*Analysis:* $C_{11}H_{15}N_3OS_2$; molecular weight=269.40. Calculated: C, 49.04%; H, 5.61%; N, 15.60%. Found: C, 49.20%; H, 5.73%; N, 15.47%.

EXAMPLE 16

*Preparation of 2-methyl-4-morpholino-dihydrothieno-[3,4-d]-pyrimidine by method B*

2.1 gm. (0.011 mol) of 2 - methyl - 4 - chloro - dihydrothieno - [3,4-d] - pyrimidine were dissolved in 6 cc. of morpholine, and the resulting solution was refluxed for four hours on an oil bath at 150° C. (bath temperature). After allowing the reaction mixture to cool, it was admixed with water and the crystalline substance which precipitated out was separated by vacuum filtration and washed several times with water. 1.5 gm. (56% of

48 theory) of raw 2 - methyl - 4 - morpholino - dihydrothieno-[3,4-d]-pyrimidine of the formula

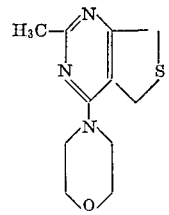

were obtained. After recrystallization from acetone, the product had a melting point of 123–124° C.

*Analysis:* $C_{11}H_{15}N_3OS$; molecular weight=237.33. Calculated: C, 55.67%; H, 6.37%; N, 17.71%. Found: C, 55.60%; H, 6.33%; N, 17.95%.

Using a procedure analogous to that described above, the following additional dihydrothieno - [3,4-d] - pyrimidine substitution products were prepared:

(a) *2 - methyl - 4 - (N' -methyl - piperazino) - dihydrothieno-[3,4-d]pyrimidine* of the formula

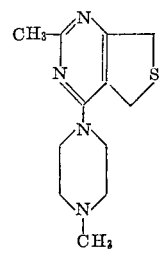

from 2 - methyl - 4 - chloro - dihydrothieno - [3,4 - d]-pyrimidine and N - methyl - piperazine. Recrystallized from ethyl acetate, the product had a melting point of 118–119° C. The yield was 38% of theory.

(b) *2 - methyl - 4 - amino - dihydrothieno - [3,4 - d]-pyrimidine* of the formula

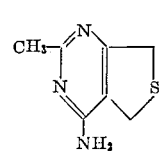

from 2 - methyl - 4 - chloro - dihydrothieno - [3,4 - d]-pyrimidine and ammonia. Recrystallized from dioxane, the product had a melting point of 235–236° C. The yield was 44% of theory.

(c) *2 - methyl - 4 - allylamino - dihydrothieno-[3,4-d]-pyrimidine* of the formula

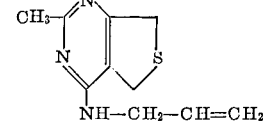

from 2-methyl-4-chloro-dihydrothieno-[3,4-d]-pyrimidine and allylamine. Recrystallized from ether, the product had a melting point of 86–87° C. The yield was 51% of theory.

(d) *2 - methyl - 4 - isopropylamino - 5 - n - propyl - dihydrothieno-[3,4-d]-pyrimidine* of the formula

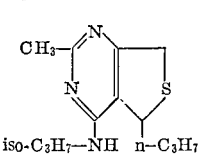

from 2-methyl-4-chloro-5-n-propyl-dihydrothieno-[3,4-d]-pyrimidine and isopropylamine. Recrystallized from petroleum ether, the product had a melting point of 137–138° C. The yield was 83% of theory.

(e) *2 - phenyl - 4 - morpholino - dihydrothieno - [3,4-d]-pyrimidine* of the formula

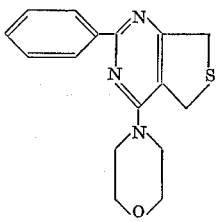

from 2-phenyl-4-chloro-dihydrothieno-[3,4-d]-pyrimidine and morpholine. Recrystallized from ethanol, the product had a melting point of 168–169° C. The yield was 79% of theory.

(f) *2 - phenyl - 4 - (2' - methyl - morpholino) - dihydrothieno-[3,4-d]-pyrimidine* of the formula

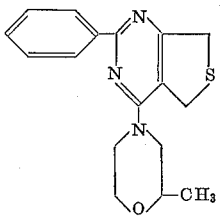

from 2-phenyl-4-chloro-dihydrothieno-[3,4-d]-pyrimidine and 2-methyl-morpholine. Recrystallized from ethanol, the product had a melting point of 169–170° C. The yield was 61% of theory.

(g) *2 - phenyl - 4 - morpholino - 5 - methyl - dihydrothieno-[3,4-d]-pyrimidine* of the formula

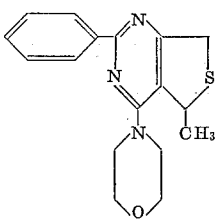

from 2 - phenyl-4-chloro-5-methyl-dihydrothieno-[3,4-d]-pyrimidine and morpholine. Recrystallized from ethanol, the product has a melting point of 120–121° C. The yield was 31% of theory.

EXAMPLE 17

*Preparation of 2-phenyl-4-ethoxy-dihydrothieno [3,4-d]-pyrimidine by the method B*

4 gm. (0.016 mol) of 2-phenyl-4-chloro-dihydrothieno-[3,4-d]-pyrimidine were added to a solution of 0.37 gm. (0.016 gm.-atoms) of the sodium in ethanol. The resulting mixture was refluxed for two hours. Thereafter, the ethanol was evaporated in vacuo. The residue was stirred with water, and the aqueous mixture was vacuum filtered. 1.8 gm. (44% of theory) of raw 2-phenyl-4-ethoxy-dihydrothieno-[3,4-d]-pyrimidine of the formula

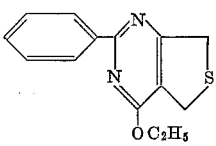

were obtained. After recrystallization from ethanol, the product had a melting point of 115–116° C.

*Analysis*: $C_{14}H_{14}N_2OS$; molecular weight=258.34. Calculated: C, 65.10%; H, 5.46%; N, 10.85%. Found: C, 65.20%; H, 5.59%; N, 11.01%.

Using a procedure analogous to that described above, the following additional dihydrothieno-[3,4-d]-pyrimidine substitution product was prepared:

(a) *2,4 - dimethoxy - dihydrothieno-[3,4-d]-pyrimidine* of the formula

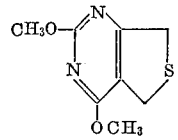

from 2-methoxy-4-chloro-dihydrothieno[3,4-d]-primidine and sodium methylate. Recrystallized from ethanol, the product had a melting point of 134–135° C.

The compounds of the present invention, that is, the dihydrothieno-[3,4-d]-pyrimidines embraced by Formula I above, their non-toxic pharmacologically acceptable acid addition salts, and their alkali metal salts have useful properties. More particularly, the compounds of the present invention exhibit cardiovascular, diuretic, sedative, analgesic and cytostatic activities. The term "cardiovascular" includes coronary vascular dilating activities, peripheral vascular dilating activities and activities on the blood pressure.

Typical examples of pharmacologically acceptable non-toxic acid addition salts are the hydrochlorides, hydrobromides, hydroiodides, sulfates, phosphates, nitrates, acetates, propionates, butyrates, valerates, oxalates, malonates, succinates, maleates, fumarates, lactates, tartrates, citrates, malates, benzoates, phthalates, cinnamates, salicylates, nicotinates, 2-furoates, 8-chloro-theophyllinates and the like.

For pharmacological purposes, the compounds of the present invention may be administered perorally or parenterally as active ingredients in customary dosage unit compositions, that is, compositions consisting essentially of an inert, physiologically compatible carrier having distributed therein one dosage unit of the active ingredient. One dosage unit of the compounds of the present invention is 10 to 200 mgm., preferably 100 mgm. Typical examples of such dosage unit compositions are tablets, coated pills, hypodermic solutions, rectal suppositories, suspensions or solutions adapted for administration per os, gelatin capsules, wafer capsules and the like.

The following examples illustrate various dosage unit compositions comprising compounds of the present invention as active ingredients. The parts are parts by weight unless otherwise specified.

EXAMPLE 18

*Tablets*

The tablets are compounded from the following ingredients:

| | Parts |
|---|---|
| 2-(N'-methyl-piperazino)-4-n-propylamino-dihydrothieno-[3,4-d]-pyrimidine | 100.0 |
| Secondary calcium phosphate | 68.0 |
| Corn starch | 50.0 |
| Polyvinylpyrrolidone | 10.0 |
| Talcum | 10.0 |
| Magnesium stearate | 2.0 |
| Total | 240.0 |

Compounding procedure:

The dihydrothieno-pyrimidine compound, the calcium phosphate, the corn starch and the polyvinylpyrrolidone are admixed with each other, and the mixture is moistened with distilled water (about 50 cc. of water per 1000 tablets). The moistened mixture is then granulated by passing it through a 1.5 mm.-mesh screen, and the moist granulate is dried at 40° C. The dry granulate is once again passed through the screen, and then the talcum and the magnesium stearate are added and thoroughly admixed. The resulting mixture is pressed into tablets each weighing 240 mgm. Each tablet contains 100 mgm. of the active ingredient.

EXAMPLE 19

*Hypodermic solution*

The solution is compounded from the following ingredients:

| | Parts by volume |
|---|---|
| 2-(N'-methyl-piperazino)-4-n-propylamino-dihydrothieno-[3,4-d]-pyrimidine | 40.0 |
| Tartaric acid | 20.0 |
| Polyethyleneglycol 600 | 250.0 |
| Distilled water, q.s.ad | 2000.0 |

Compounding procedure:

The polyethyleneglycol is melted and is admixed with approximately the same volume of distilled water. The mixture is then heated to 80° C. and the tartaric acid and the dihydrothieno-pyrimidine compound are added one after the other. The mixture is then cooled to room temperature, diluted with distilled water to the desired volume, and the solution is filtered until free from suspended particles. The filtered solution is filled into white 2 cc. ampules, which are then sterilized for 20 minutes at 120° C. and sealed. Each ampule contains 40 mgm. of the active ingredient.

EXAMPLE 20

*Coated pills*

The pill cores are compounded from the following ingredients:

| | Parts |
|---|---|
| 2-pyrrolidino - 4 - isopropylamino - dihydrothieno-[3,4-d]-pyrimidine | 75.0 |
| Potato starch | 40.0 |
| Gelatin | 4.0 |
| Magnesium stearate | 1.0 |
| Total | 120.0 |

Compounding procedure:

The dihydrothieno-pyrimidine compound and the potato starch are admixed with each other, and the mixture is moistened with an aqueous 12% solution of the gelatin. The moist mixture is granulated by passing it through a 1 mm.-mesh screen. The moist granulate is dried at 40° C. and is again passed through the screen. The dry granulate is admixed with the magnesium stearate, and the mixture is pressed into 120 mgm. tablets, which are then provided with a coating consisting essentially of sugar and talcum. The coated pills are then polished with beeswax. Each pill weighs about 200 mgm. and contains 75 mgm. of the active ingredient.

EXAMPLE 21

*Suppositories*

The suppositories are compounded from the following ingredients:

| | Parts |
|---|---|
| 2-pyrrolidino - 4 - isopropylamino-dihydrothieno-[3,4-d]-pyrimidine | 100.0 |
| Suppository base (cocoa butter) | 1600.0 |
| Total | 1700.0 |

Compounding procedure:

The suppository base is melted and cooled to 37° C. and the finely powdered dihydrothieno-pyrimidine compound is stirred into it. The mixture is homogenized and poured into cooled suppository molds each holding 1700 mgm. of the mixture. Each suppository contains 100 mgm. of the active ingredient.

EXAMPLE 22

*Drop solution for peroral administration*

The solution is compounded from the following ingredients:

| | Parts |
|---|---|
| 2-(N' - methyl-piperazino) - 4 - piperidino - 5-methyl-dihydrothieno-[3,4-d]-pyrimidine | 20.0 |
| Tartaric acid | 10.0 |
| Cane sugar | 300.0 |
| Sorbic acid | 1.0 |
| Cocoa essence | 50.0 |
| Ethanol, by volume | 200.0 |
| Polyethyleneglycol 600, by volume | 200.0 |
| Distilled water, q.s.ad., by volume | 1000.0 |

Compounding procedure:

The sorbic acid is dissolved in the ethanol, and an equal amount of distilled water is added to the solution. The dihydrothieno-pyrimidine compound and the tartaric acid are dissolved in the aqueous solution while stirring (Solution A). The cane sugar is dissolved in the residual amount of water (Solution B). Solution B, the polyethyleneglycol and the essence of cocoa are added to Solution A while stirring. The resulting mixed solution is then filtered through a suitable filter. 1 cc. of the solution contains 20 mgm. of the active ingredient.

EXAMPLE 23

*Gelatin capsules*

The contents of the capsules are compounded from the following ingredients:

| | Parts |
|---|---|
| 2-(N'-methyl-piperazino) - 4 - piperidino-5-methyl-dihydrothieno-[3,4-d]-pyrimidine | 100.0 |
| Colloidal silicic acid | 10.0 |
| Total | 110.0 |

Compounding procedure:

The dihydrothieno-pyrimidine compound is thoroughly admixed with the silicic acid, and the mixture is forced through a 0.75 mm.-mesh screen. The screened mixture is then filled into gelatin capsules each holding 110 mgm. of the mixture. Each capsule contains 100 mgm. of the active ingredient.

EXAMPLE 24

*Wafer capsules*

The contents of the capsules are compounded from the following ingredients:

| | Parts |
|---|---|
| 2-morpholino - 4 - allyloxy-dihydrothieno-[3,4-d]-pyrimidine | 200.0 |
| Colloidal silicic acid | 20.0 |
| Total | 220.0 |

Compounding procedure:

The dihydrothieno-pyrimidine compound and the silicic acid are thoroughly admixed with each other, and the mixture is passed through a 1.0 mm.-mesh screen. The screened mixture is then filled into wafer capsules, each holding 220 mgm. of the mixture. Each capsule contains 200 mgm. of the active ingredient.

Although the dosage unit composition examples given above illustrate only a limited number of the compounds of the invention as active ingredients, it should be understood that any of the other compounds embraced by Formula I or their non-toxic acid addition salts may be substituted for the particular compounds used as active ingredients in Examples 18 to 24. Moreover, it should be understood that the quantities of the active ingredients in the illustrative dosage unit compositions may be varied within the dosage unit range limits indicated above to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention or the scope of the appended claims.

We claim:

1. A compound selected from the group consisting of dihydrothieno-[3,4-d]pyrimidines of the formula

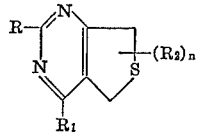

wherein

R is selected from the group consisting of hydrogen, lower alkyl, phenyl, benzyl, hydroxyl, lower alkoxy, mercapto, lower alkyl-mercapto, amino, mono-lower alkylamino, di-lower alkylamino, pyrrolidino, piperidino, morpholino, 2-lower alkyl-morpholino and N'-lower alkyl-piperazino, $R_1$ is selected from the group consisting of halogen, hydroxyl, lower alkoxy, lower alkoxy-lower alkoxy, di-lower alkylamino-lower alkoxy, lower alkenyloxy, mercapto, lower alkyl-mercapto, amino, hydrazino, phenyl-hydrazino, mono-lower alkylamino, mono-lower alkenylamino, anilino, cyclohexylamino, phenyl-lower alkyl-amino, (di-lower alkylamino)-lower alkylamino, (lower alkoxy-lower alkyl)-amino, mono-(hydroxy-lower alkyl)-amino, di-(hydroxy-lower alkyl)-amino, (hydroxy-lower alkyl)-lower alkylamino, lower alkyl-benzylamino, pyrrolidino, piperidino, morpholino, 2-lower alkyl-morpholino and N'-lower alkyl-piperazino, $R_2$ is lower alkyl, and $n$ is an integer from 0 to 2, inclusive, and their non-toxic, pharmacologically acceptable acid addition salts.

2. A compound selected from the group consisting of dihydrothieno-[3,4-d]-pyrimidines of the formula

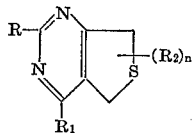

wherein

R is selected from the group consisting of hydrogen, lower alkyl, phenyl, benzyl, hydroxyl, lower alkoxy, mercapto, lower alkyl-mercapto, amino, mono-lower alkylamino, di-lower alkylamino, pyrrolidino, piperidino, morpholino, 2-lower alkyl-morpholino and N-lower alkyl-piperazino, $R_1$ is a basic substituent selected from the group consisting of amino, hydrazino, phenyl-hydrazino, mono-lower alkylamino, mono-lower alkenylamino, anilino, cyclohexylamino, phenyl-lower alkylamino, (di-lower alkylamino)-lower alkylamino, (lower alkoxy-lower alkyl)-amino, mono-(hydroxy-lower alkyl)-amino, di-(hydroxy-lower alkyl)-amino, (hydroxy-lower alkyl)-lower alkylamino, lower alkyl-benzylamino, pyrrolidino, morpholino, 2-lower alkyl-morpholino and N'-lower alkyl-piperazino, $R_2$ is lower alkyl, and $n$ is an integer from 0 to 2, inclusive, and their non-toxic, pharmacologically acceptable acid addition salts.

3. 2-(N'-methyl-piperazino)-4-isopropylamino-dihydrothieno-[3,4-d]-pyrimidine.

4. 2-(N'-methyl-piperazino) - 4 - n-propylamino-dihydrothieno-[3,4-d]-pyrimidine.

5. 2-pyrrolidino - 4 - isopropylamino - dihydrothieno-[3,4-d]-pyrimidine.

6. 2-(N'-methyl-piperazino)-4-piperidino-5 - methyl-dihydrothieno-[3,4-d]-pyrimidine.

7. 2-(N'-methyl-piperazino)-4-n-propylamino-5 - methyl-dihydrothieno-[3,4-d]-pyrimidine.

8. 2-(N'-methyl-piperazino)-4-isobutylamino-5-methyl-dihydrothieno-[3,4-d]-pyrimidine.

9. 2-morpholino - 4 - isobutylamino-5-n-propyl - dihydrothieno-[3,4-d]-pyrimidine.

10. 2-dimethylamino - 4 - morpholino - dihydrothieno-[3,4-d]-pyrimidine.

11. 2-morpholino - 4 - amino-dihydrothieno-[3,4-d]-pyrimidine.

12. 2-morpholino - 4 - allyloxy-dihydrothieno-[3,4-d]-pyrimidine.

13. 2-morpholino - 4 - isopropoxy-dihydrothieno-[3,4-d]-pyrimidine.

14. 2-methyl - 4 - morpholino - dihydrothieno-[3,4-d]-pyrimidine.

References Cited by the Examiner

UNITED STATES PATENTS

| | | | |
|---|---|---|---|
| 2,792,394 | 5/1957 | Himel et al. | 260—247.1 |
| 2,921,073 | 1/1960 | Conover et al. | 260—256.5 |
| 2,937,118 | 5/1960 | Van Haxthausen et al. | 167—65 |
| 3,063,902 | 11/1962 | Gray et al. | 167—65 |

FOREIGN PATENTS 617,435    2/1949    Great Britain.

ALEX MAZEL, Primary Examiner.

HENRY R. JILES, Examiner.

JOSE TOVAR, ROBERT L. PRICE, Assistant Examiners.

UNITED STATES PATENT OFFICE
CERTIFICATE OF CORRECTION

Patent No. 3,272,811                  September 13, 1966

Gerhard Ohnacker et al.

It is hereby certified that error appears in the above numbered patent requiring correction and that the said Letters Patent should read as corrected below.

Column 7, lines 36 and 37, for "hychloride" read -- hydrochloride --; column 10, line 4, for "161°C." read -- 261°C. --; same column 10, lines 56 to 61, the formula should appear as shown below instead of as in the patent:

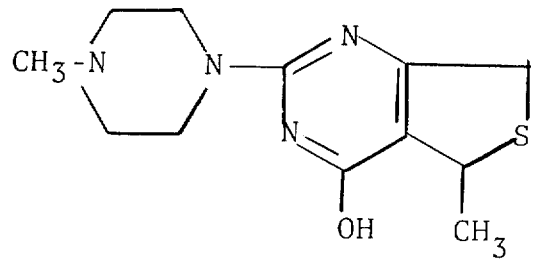

column 13, line 11, for "meting" read -- melting --; column 15, line 40, for "[3,3-d]" read -- [3,4-d] --; column 18, lines 40 to 44, the formula should appear as shown below instead of as in the patent:

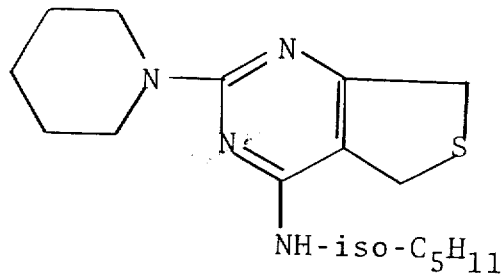

column 18, line 59, for "land" read -- and --; column 24, line 48, for "dihydrothiene" read -- dihydrothieno --; column 35, lines 15 to 20, the formula should appear as shown below instead of as in the patent:

3,272,811
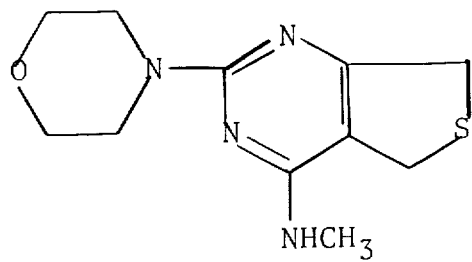
column 36, lines 55 to 59, the formula should appear as shown below instead of as in the patent:
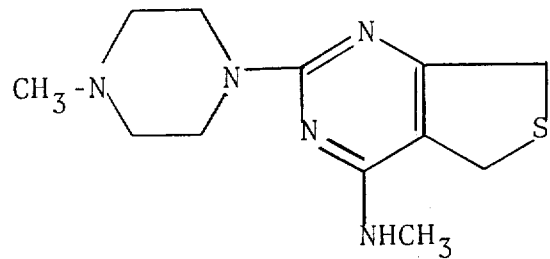
column 38, lines 30 to 34, the formula should appear as shown below instead of as in the patent:
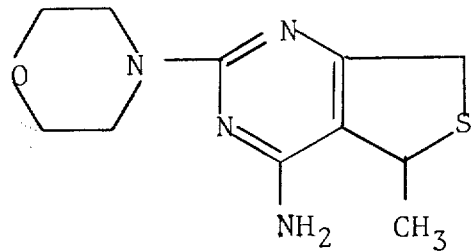

3,272,811 column 41, line 44, for "Recrystallization" read -- Recrystallized --; line 45, after "melting" insert -- point --; column 43, line 53, for "2,4-d" read -- 3,4-d --.

Signed and sealed this 29th day of August 1967.

(SEAL)
Attest:

ERNEST W. SWIDER  
Attesting Officer

EDWARD J. BRENNER  
Commissioner of Patents